(12) United States Patent
Goodson, III

(10) Patent No.: US 8,436,197 B2
(45) Date of Patent: May 7, 2013

(54) PALLADIUM COMPLEXES AND POLYMERIZATION AND COUPLING PROCESSES THEREOF

(75) Inventor: Felix E Goodson, III, Kennett Square, PA (US)

(73) Assignee: West Chester University of Pennsylvania of the State System of Higher Education, West Chester, PA (US)

( * ) Notice: Subject to any disclaimer, the term of this patent is extended or adjusted under 35 U.S.C. 154(b) by 721 days.

(21) Appl. No.: 12/259,001

(22) Filed: Oct. 27, 2008

(65) Prior Publication Data

US 2009/0111962 A1    Apr. 30, 2009

Related U.S. Application Data

(60) Provisional application No. 60/982,685, filed on Oct. 25, 2007.

(51) Int. Cl.
  *C07F 15/00* (2006.01)
  *C07F 17/02* (2006.01)

(52) U.S. Cl.
  USPC ............. 556/136; 556/22; 528/394; 528/397; 528/398; 528/400; 528/487

(58) Field of Classification Search .............. 556/136, 556/22; 528/394, 397, 398, 400, 487
  See application file for complete search history.

(56) References Cited

U.S. PATENT DOCUMENTS

| | | | | | |
|---|---|---|---|---|---|
| 4,347,232 | A | * | 8/1982 | Michaelson | 423/584 |
| 4,756,848 | A | * | 7/1988 | Tieke et al. | 252/511 |
| 4,824,765 | A | * | 4/1989 | Sperry et al. | 430/281.1 |
| 5,030,742 | A | * | 7/1991 | Tieke | 556/136 |
| 5,045,436 | A | * | 9/1991 | Tieke et al. | 430/315 |
| 5,231,223 | A | * | 7/1993 | Bader et al. | 562/87 |
| 5,637,763 | A | * | 6/1997 | Baumeister et al. | 562/83 |
| 7,074,884 | B2 | | 7/2006 | Towns et al. | |
| 7,173,103 | B2 | * | 2/2007 | Towns et al. | 528/394 |

OTHER PUBLICATIONS

Fairlamb, I. J. S.; Kapdi, A. R.; Lee, A. F., "Eta-2 dba complexes of palladium(0): The substituent effect in Suzuki-Miyaura coupling" *Org. Lett.* 2004, 6, 4435-4438.

Fairlamb, I. J. S.; Kapdi, A. R.; Lee, A. F.; McGlacken, G. P.; Weissburger, F.; de Vries, A. H. M.; Schmieder-van de Vondervoort, L., "Exploiting Noninnocent (E,E)-Dibenzylideneacetone (dba) Effects in Palladium(0)-Mediated Cross-Coupling Reactions: Modulation of the Electronic Properties of dba Affects Catalyst Activity and Stability in Ligand and Ligand-Free Reaction Systems", *Chem. Eur. J.* (Sep. 2006), 12, 8750-8761.

Macé, Y.; Kapdi, A. R.; Fairlamb, I. J. S.; Jutand, A., "Influence of the dba Substitution on the Reactivity of Palladium(0) Complexes Generated from Pd2(dba-n,n'-Z)3 or Pd(dba-n,n'-Z)2 and PPh3 in Oxidative Addition with Iodobenzene", *Organometallics* (Mar. 2006), 25, 1795-1800.

(Continued)

*Primary Examiner* — Michael L Leonard
(74) *Attorney, Agent, or Firm* — Novak Druce Connolly Bove + Quigg LLP

(57) ABSTRACT

The present invention is related to palladium complexes having substituted diarylideneacetone ligands and coupling and polymerization processes thereof.

19 Claims, 1 Drawing Sheet

OTHER PUBLICATIONS

Amatore, C.; Jutand, A.; Khalil, F.; M'Barki, M. A.; Mottier, L., "Rates and Mechanisms of Oxidative Addition to Zerovalent Palladium Complexes Generated in Situ from Mixtures of Pd(dba)2 and Triphenylphosphine", *Organometallics* 1993, 12, 3168-3178.

Amatore, C.; Jutand, A., "Mechanistic and kinetic studies of palladium catalytic systems", *J. Organomet. Chem.* 1999, 576, 254.

Amatore, C.; Jutand, A., "Structural and Mechanistic Aspects of Palladium-Catalyzed Cross-Couplings", in *Handbook of Organopalladium Chemistry for Organic Synthesis*, E. Negishi, Editor. 2002, John Wiley & Sons, Inc.: Hoboken, NJ. p. 943-972.

Ito, T.; Takahashi, Y.; Ishii, Y., "Conveniient Preparation of Novel Palladiiuni-pi-Olefin Complexes from Bis(dibenzylideneacetone)palladium(0)", *J. Chem. Soc., Chem. Commun.* 1972, 629.

Ukai, T.; Kawazura, H.; Ishii, Y.; Bonnett, D. J.; Ibers, J. A., "Chemistry of Dibenzylideneacetone-Palladium(0) Complexes. 1. Novel Tris(dibenzylideneacetone)dipalladium(solvent) Complexes and their Reactions with Quinones", *J. Organomet. Chem.* 1974, 65, 253-266.

Keasey, A.; Mann, B. E.; Yates, A.; Maitlis, P. M., "Palladium(0) and Platinum(0) Complexes of p,p'-Diisopropyldibenzylideneacetone and Their NMR Spectra", *J. Organomet. Chem.* 1978, 152, 117-123.

Ito, N.; Saji, T.; Aouagui, S., "Voltammetric Studies of the Metal-Ligand Interaction in Low-Valent Metal-Olefin pi-Complexes. Part 1. [Pd(0)$_2$(Dibenzylideneacetone)$_3$] and [Pt(0)$_2$(Dibenzylideneacetone)$_3$]", *J. Electroanal. Chem.* 1983, 144, 153-162.

Tenkovtsev, A. V.; Yakimansky, A. V.; Dudkina, M. M.; Lukoshkin, V. V.; Komber, H.; Häussler, L.; Böhme, F., "Ionic Complexes of Bis(hydroxyarylidene)alkanones with Strong Polymeric Bases as a New Class of Third-Order Nonlinear Optical Chromophores", *Macromolecules* 2001, 34, 7100-7107.

Dudkina, M. M.; Tenkovtsev, A. V.; Komber, H.; Häussler, L.; Böhme, F., "Competitive Influence of Carboxylic Groups in Ionic Complex Formation of 4-Hydroxybenzylidene Alkanones with Polyamidines", *Macromolecules* 2004, 37, 8389-93.

Goodson, F. E.; Novak, B. M., "Palladium-Mediated Soluble Precursor Route into Poly(arylethynylenes) and Poly(arylethylenes)", *Macromolecules* 1997, 30, 6047-6055.

Goodson, F. E.; Wallow, T. I.; Novak, B. M., "Mechanistic Studies on the Aryl-Aryl Interchange Reaction of ArPdL2I (L=Triarylphosphine) Complexes", *J. Am. Chem, Soc.* 1997, 119, 12441-12453.

Goodson, F. E.; Wallow, T. I.; Novak, B. M., "Application of "Transfer-Free" Suzuki Coupling Protocols toward the Synthesis of "Unambiguously Linear" Poly(p-Phenylenes)", *Macromolecules* 1998, 31, 2047-2056.

Goodson, F. E.; Wallow, T. I.; Novak, B. M., "Accelerated Suzuki Coupling via a Ligandless Palladium Catalyst: 4-Methoxy-2'-methylbiphenyl", *Org. Synth.* 1998, 75, 61-68.

Goodson, F. E.; Hauck, S. I.; Hartwig, J. F., "Palladium-Catalyzed Synthesis of Pure, Regiodefined Polymeric Triarylamines", *J. Am. Chem. Soc.* 1999, 121, 7527-7539.

Hargadon, M. T.; Davey, E. A.; McIntyre, T. B.; Gnanamgari, D.; Wynn; C. M.; Swift, R. C.; Zimbalist, J. R.; Fredericks, B. L.; Nicastro, A. J.; Goodson, F. E., "Alternating Block Copolymers Consisting of Oligo(phenylene) and Oligo(ethylene glycol) Units of Defined Length: Synthesis, Thermal Characterization, and Light Emitting Properties", *Macromolecules* (Jan. 2008), 41, 741-750.

Murage, J.; Eddy, J. W.; Zimbalist, J. R.; McIntyre, T. B.; Wagner, Z. R.; Goodson, F. E., "Effect of Reaction Parameters on the Molecular Weights of Polymers Formed in a Suzuki Polycondensation", *Macromolecules* (Oct. 4, 2008), 41, 7330-7338.

Miyaura, N., "Cross-coupling reaction of organoborn compounds via base-assisted transmetalation to palladium(II) complexes", *J Organomet. Chem.* 2002, 653, 54-57.

Miyaura, N., "Organoboron Compounds", *Top. Curr. Chem.* 2002, 219, 12-59.

Suzuki, A., "Overview of the Suzuki Protocol with B", in *Handbook of Organopalladium Chemistry for Organic Synthesis*, E. Negishi, Editor. 2002, John Wiley & Sons, Inc.: Hoboken, NJ. p. 249-262.

Suzuki, A., "Cross-coupling reactions via organoboranes", *J. Organomet. Chem.* 2002, 653, 83-90.

Rehahn, M.; Schlüter, A.-D.; Wegner, G.; Feast, W. J., "Soluble poly(para-phenylene)s. 2. Improved synthesis of poly(para-2,5-di-n-hexylphenylene) via Pd-catalysed coupling of 4-bromo-2,5-di-n-hexylbenzeneboronic acid", *Polymer* 1989, 30, 1060-1062.

Schlüter, A. D., "The Tenth Anniversary of Suzuki Polycondensation", *J. Polym. Sci., Polym. Chem. Ed.* 2001, 39, 1533-1556.

Schlüter, A.-D.; Bo, Z., "Synthesis of Conjugated Polymers for Materials Science", in *Handbook of Organopalladium Chemistry for Organic Synthesis*, E. Negishi, Editor. 2002, John Wiley & Sons, Inc.: Hoboken, NJ. p. 825-861.

Yang, R.; Tian, R.; Yan, J.; Zhang, Y.; Yang, J.; Hou, Q.; Yang, W.; Zhang, C.; Cao, Y., "Deep-Red Electroluminescent Polymers: Synthesis and Characterization of New Low-Band-Gap Conjugated Copolymers for Light-Emitting Diodes and Photovoltaic Devices", *Macromolecules* 2005, 38, 244-253.

Zhou, X.-H.; Zhang, Y.; Xie, Y.-Q.; Cao, Y.; Pei, J., "Effect of Flourenone Units on the Property of Polyfluorene and Oligofluorene Derivatives: Synthesis, Struture-Properties Relationship, and Electroluminescence", *Macromolecules* (May 2006), 39, 3830-3840.

Neher, D., "Polyfluorene Homopolymers: Conjugated Liquid-Crystalline Polymers for Bright Blue Emission and Polarized Electroluminescence", *Macromol. Rapid Commun.* 2001, 22, 1365-1385.

Leclerc, M., "Polyfluorenes: Twenty Years of Progress", *J. Polym. Sci., Polym. Chem. Ed.* 2001, 39, 2867-2873.

Chen, P.; Yang, G.; Liu, T.; Li, T.; Wang, M.; Huang, W., "Optimization of opto-electronic property and device efficiency of polyfluorenes by tuning structure and morphology", *Polym. Int.* (Apr. 2006) 55, 473-490.

Smith, G. B.; Dezeny, G. C.; Hughes, D. L.; King, A. O.; Verhoeven, T. R., "Mechanistic Studies of the Suzuki Cross-Coupling Reaction", *J. Org. Chem.* 1994, 59, 8151-8156.

Goodson, F. E.; Cichowicz, M. B., "Organic Synthesis Using Metal-Mediated Coupling Reactions", in *Encyclopedia of Inorganic Chemistry*, R.B. King, Editor. 2005, John Wiley & Sons, Inc.: Hoboken, NJ. p. 3750-3770.

Paul, F.; Patt, L; Hartwig, J. F., "Structural Characterization and Simple Synthesis of {Pd[P(o-to1)3]2}. dimeric Palladium (II) Complexes, and Corresponding Monometallic Amine Complexes", *Organometallics* 1995, 14, 3030-3039.

Grushin, V. V., "Thermal Stability, Decomposition Paths, and Ph/Ph Exchange Reactions of [(Ph3P)2Pd(Ph)X] (X = I, Br, Cl, F, and HF2)", *Organometallics* 2000, 19, 1888-1900.

Kong, K.-C.; Cheng, C.-H., "Facile Aryl-Aryl Exchange between the Palladium Center and Phosphine Ligands in Palladium(II) Complexes", *J. Am. Chem. Soc.* 1991, 113, 6313-6315.

Wagner, Z. R.; Roenigk, T. K.; Goodson, F. E., "Rigid-Flexible Alternating Block Copolymers That Contain Poly(p-phenylene) Units of Defined Length as the Rigid Blocks", *Macromolecules* 2001, 34, 5740-5743.

Ouchi, M.; Inoue, Y.; Liu, Y.; Nagamune, S.; Nakamura, S.; Wada, K.; Hakushi, T., "Convenient and Efficient Tosylation of Oligoethylene Glycols and the Related Alcohols in Tetrahydrofuran-Water in the Presence of Sodium Hydroxide", *Bull. Chem. Soc. Jpn.* 1990, 63, 1260-1262.

Pierpont, C. G.; Mazza, M. C., "Crystal and Molecular Structure of Tris(dibenzylideneacetone)dipalladium(0)" *Inorg. Chem.* 1974, 13, 1891-1895.

Eddy, J. and Goodson, F.E., Poster Presentation Part I, "Synthesis of Substituted Tris(dibenzylideneacetone)dipalladium(0) Complexes and their Use in Suzuki Coupling Polymerizations", Joint Meeting of the 17th Annual Saint Joseph's University Sigma Xi Student Research Symposium and the 60th Annual Eastern Colleges Science Conference, Philadelphia, PA (Apr. 22, 2006).

Eddy, J. and Goodson, F.E., Poster Presentation Part II, "Synthesis of Substituted Tris(dibenzylideneacetone)dipalladium(0) Complexes and their Use in Suzuki Coupling Polymerizations", Joint Meeting of the 17th Annual Saint Joseph's University Sigma Xi Student Research Symposium and the 60th Annual Eastern Colleges Science Conference, Philadelphia, PA (Apr. 22, 2006).

Statement of Felix E. Goodson III re Poster Presentation, Eddy, J. and Goodson, F.E., 39th Middle Atlantic Regional Meeting of the American Chemical Society, Collegeville, PA (May 16, 2007).

Statement of Felix E. Goodson III re Oral Presentation: Eddy, J. and Goodson, F.E., Presentation, CHE 491 (Chemistry Seminar), West Chester University Seminar, West Chester, PA (Oct. 25, 2006).

Statement of Felix E. Goodson III re inadvertent errors in Table 2 of the specification.

Corwin Hansch, et al.; "'Aromatic' Substituent Constants for Structure-Activity Correlations"; Journal of Medicinal Chemistry; 1973; pp. 1207-1216; vol. 16, No. 11; California, USA.

* cited by examiner

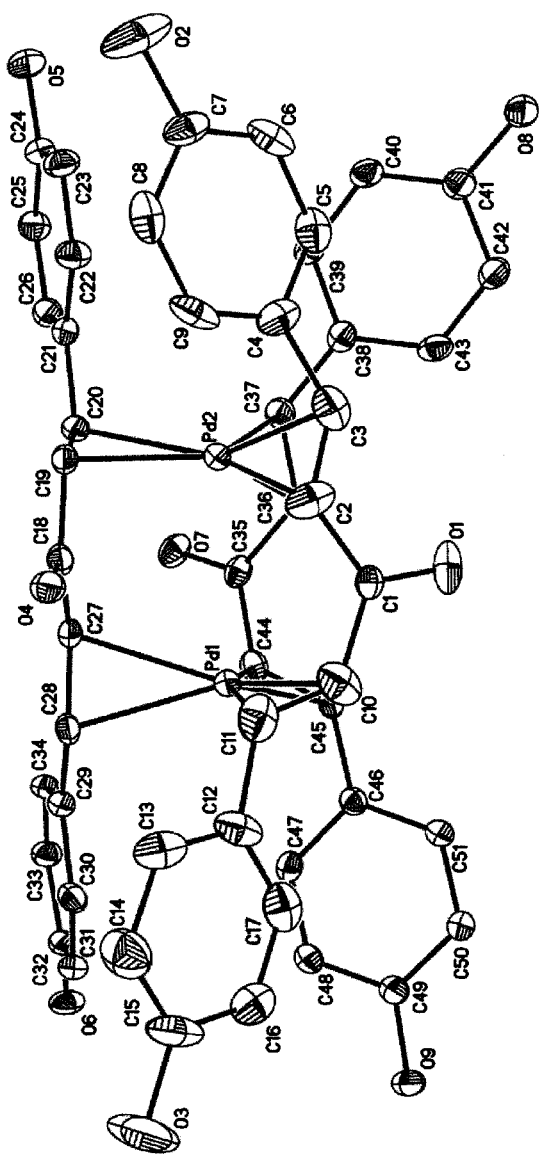

PALLADIUM COMPLEXES AND POLYMERIZATION AND COUPLING PROCESSES THEREOF

This application claims the benefit of priority of U.S. Provisional Application No. 60/982,685, filed Oct. 25, 2007, which is incorporated herein by reference in its entirety.

FIELD OF THE INVENTION

The present invention is related to palladium complexes having substituted diarylideneacetone ligands and coupling and polymerization processes thereof.

BACKGROUND OF THE INVENTION

The Suzuki coupling reaction is a popular method of coupling an aryl bromide or iodide with an aryl boronic acid or aryl boronic ester (eq. 1) (e.g., Miyaura, N., *Top. Curr. Chem.* 2002, 219, 12-59). The Suzuki coupling reaction has also been used to perform polymerization reactions (e.g., Schlüter, A. D., *J. Polym. Sci., Polym. Chem. Ed* 2001, 39, 1533-1556). For example, the synthesis of alternating rigid-flexible block copolymers based upon poly(p-phenylene) is of interest because they exhibit technologically useful properties such as photoluminescence (eq. 2).

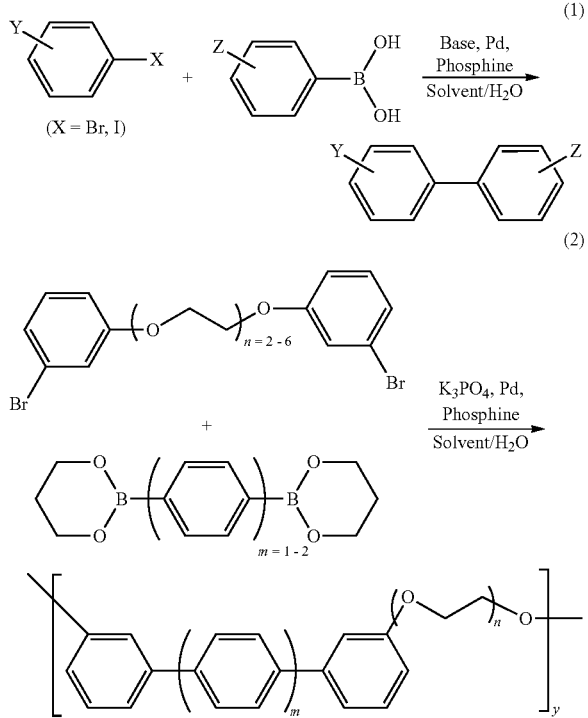

Recent years have seen the development of new catalyst systems with impressive activities in small-molecule examples. Despite this, many recent polymerizations utilize the conditions employed in Schlüter's original report, generally resulting in mediocre molecular weights (e.g., Rehahn, M.; Schlüter, A.-D.; Wegner, G.; Feast, W. J., *Polymer* 1989, 30, 1060-1062; Yang, R.; Tian, R.; Yan, J.; Zhang, Y.; Yang, J.; Hou, Q.; Yang, W.; Zhang, C.; Cao, Y., *Macromolecules* 2005, 38, 244-253). This is a problem, since the physical properties (toughness, thermal stability, adhesiveness, etc.) of a polymer are extremely sensitive to molecular weight, with samples at the lower end generally producing unacceptable materials. Consequently, if the technological applications envisioned for these polymers are ever to be realized, a means of improving their molecular weights must be found. The present invention addresses this need and others.

SUMMARY OF THE INVENTION

The present invention provides palladium complexes, or salts thereof, having at least one atom of palladium(0), at least one ligand of Formula Ia, and, optionally, one or more $L^1$;

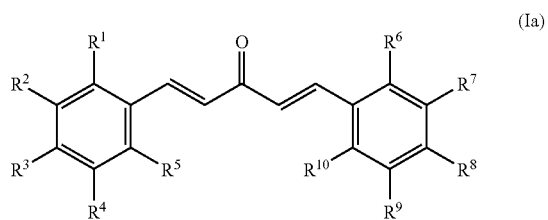

(Ia)

wherein:

$L^1$ is a ligand;

$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—$S(O)_2$—, HO—S(O)—, $(HO)_2P(O)$—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein the $C_{1-4}$ alkylene is substituted by a moiety selected from $C_{1-4}$ alkoxy, $C_{1-4}$ haloalkoxy, carboxy, HO—$S(O)_2$—, HO—S(O)—, $(HO)_2P(O)$—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 independently selected $R^a$ groups;

or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 independently selected $R^b$ groups; and each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—$S(O)_2$—, HO—S(O)—, $(HO)_2P(O)$—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy; with the five provisos that:

(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$ alkyl)amino, HO—$S(O)_2$—, HO—S(O)—, $(HO)_2P(O)$—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein the $C_{1-4}$ alkylene is substituted by a moiety selected from carboxy, HO—$S(O)_2$—, HO—S(O)—, $(HO)_2P(O)$—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and (2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

In some embodiments, the palladium complexes, or salts thereof, have Formula I:

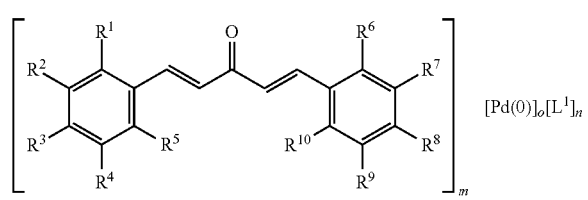

(I)

or salt thereof, wherein:
n is from 0 to 2;
m is from 1 to 4;
o is from 1 to 2; and
$L^1$, $R^1$, $R^2$, $R^3$, $R^4$, $R^5$, $R^6$, $R^7$, $R^8$, $R^9$, $R^{10}$, $R^a$, and $R^b$ are as hereinbefore described.

The present invention further provides processes for preparing an diaromatic compound, comprising mixing a palladium complex of the invention, or salt thereof, with a composition comprising one or more materials selected from an aromatic substrate having one group selected from bromo, iodo, tosylate, benzenesulfonate, mesylate, triflate, and chloro, an aromatic boronate having one group selected from boronic acid, boronic ester, and borane, a base, a ligand, an organic solvent, and water; and after the mixing, adding the remaining one or more materials and reacting under conditions sufficient to form a diaromatic compound.

The present invention further provides polymerization processes comprising mixing a palladium complex of the invention, or salt thereof, with a composition comprising one or more materials selected from an aromatic substrate having two groups independently selected from bromo, iodo, tosylate, benzenesulfonate, mesylate, triflate, and chloro, an aromatic di boronate having two groups independently selected from boronic acid, boronic ester, and borane, a base, a ligand, an organic solvent and water; and after the mixing, adding the remaining one or more materials and reacting under conditions sufficient to form a polymer.

The present invention further provides mixtures comprising an aromatic substrate having one group selected from bromo, iodo, tosylate, benzenesulfonate, mesylate, triflate, and chloro, an aromatic boronate having one group selected from boronic acid, boronic ester, and borane, a base, water, and a palladium complex of the invention, or salt thereof.

The present invention further provides mixtures comprising an aromatic substrate having one group selected from bromo, iodo, tosylate, benzenesulfonate, mesylate, triflate, and chloro, an aromatic boronate having one group selected from boronic acid, boronic ester, and borane, a base, water, and a ligand of Formula Ia, or salt thereof:

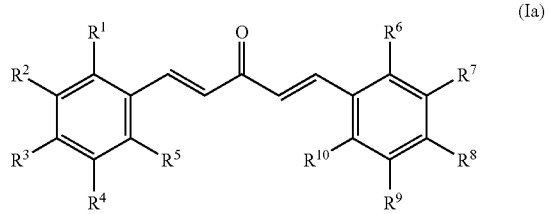

(Ia)

wherein:
$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S(O)$_2$—, HO—S(O)—, (HO)$_2$P(O)—, and $C_{1-4}$ alkylene, wherein the $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, and quaternary salt of $C_{2-8}$ dialkylamino;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups;

or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups;

each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S(O)$_2$—, HO—S(O)—, and (HO)$_2$P(O)—; and with the five provisos that:

(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$ alkyl)amino, HO—S(O)$_2$—, HO—S(O)—, (HO)$_2$P(O)—, and a quaternary salt of $C_{2-8}$ dialkylamino; wherein the $C_{1-4}$ alkylene is substituted by a moiety selected from carboxy, HO—S(O)$_2$—, HO—S(O)—, (HO)$_2$P(O)—, and a quaternary salt of $C_{2-8}$ dialkylamino;

(2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 Ra independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

The present invention further provides mixtures comprising an aromatic substrate having two groups selected from bromo, iodo, tosylate, benzenesulfonate, mesylate, triflate, and chloro, an aromatic diboronate having two groups selected from boronic acid, boronic ester, and borane, a base, water, and a palladium complex of the invention, or salt thereof.

The present invention further provides mixtures comprising an aromatic substrate having two groups selected from bromo, iodo, tosylate, benzenesulfonate, mesylate, triflate, and chloro, an aromatic diboronate having two groups selected from boronic acid, boronic ester, and borane, a base, water, and a ligand of Formula Ia:

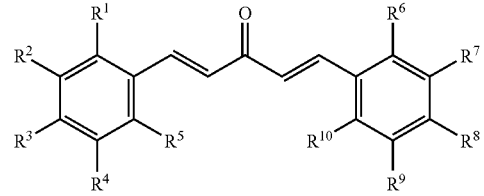

wherein:

$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S(O)$_2$—, HO—S(O)—, (HO)$_2$P(O)—, and $C_{1-4}$ alkylene, wherein the $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, and quaternary salt of $C_{2-8}$ dialkylamino;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by to 2 $R^a$ independently selected groups;

or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups;

each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S(O)$_2$—, HO—S(O)—, and (HO)$_2$P(O)—; and with the five provisos that:

(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$ alkyl)amino, HO—S(O)$_2$—, HO—S(O)—, (HO)$_2$P(O)—, and a quaternary salt of $C_{2-8}$ dialkylamino; wherein the $C_{1-4}$ alkylene is substituted by a moiety selected from carboxy, HO—S(O)$_2$—, HO—S(O)—, (HO)$_2$P(O)—, and a quaternary salt of $C_{2-8}$ dialkylamino;

(2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining R$^1$, R$^2$, R$^3$, R$^4$, and R$^5$ adjacent groups, along with the carbons to which they are attached, do not form a fused phenyl ring or a 5- or 6-membered heteroaryl ring, each of which is optionally substituted by 1 to 2 R$^a$ independently selected groups; and (3) if one of R$^6$, R$^7$, R$^8$, R$^9$, and R$^{10}$ is selected from C$_{3-6}$ cycloalkyl, phenyl, a 5- or 6-membered heteroaryl ring, or a 5- or 6-membered hetercycloalkyl ring; then (a) the remaining R$^6$, R$^7$, R$^8$, R$^9$, and R$^{10}$ groups are not selected from C$_{3-6}$ cycloalkyl, phenyl, a 5- or 6-membered heteroaryl ring, and a 5- and 6-membered hetercycloalkyl ring; and (b) the remaining R$^6$, R$^7$, R$^8$, R$^9$, and R$^{10}$ adjacent groups, along with the carbons to which they are attached, do not form a fused phenyl ring or a 5- or 6-membered heteroaryl ring, each of which is optionally substituted by 1 to 2 R$^b$ independently selected groups; and (4) if two adjacent groups selected from R$^1$, R$^2$, R$^3$, R$^4$, and R$^5$, along with the carbons to which they are attached, form a fused phenyl ring or a 5- or 6-membered heteroaryl ring, each of which is optionally substituted by 1 to 2 R$^a$ independently selected groups; then: (a) the remaining R$^1$, R$^2$, R$^3$, R$^4$, and R$^5$ groups are not selected from C$_{3-6}$ cycloalkyl, phenyl, a 5- or 6-membered heteroaryl ring, and a 5- or 6-membered hetercycloalkyl ring; and (b) the remaining R$^1$, R$^2$, R$^3$, R$^4$, and R$^5$ adjacent groups, along with the carbons to which they are attached, do not form a fused phenyl ring or a 5- or 6-membered heteroaryl ring, each of which is optionally substituted by 1 to 2 R$^a$ independently selected groups; and (5) if two adjacent groups selected from R$^6$, R$^7$, R$^8$, R$^9$, and R$^{10}$, along with the carbons to which they are attached, form a fused phenyl ring or a 5- or 6-membered heteroaryl ring, each of which is optionally substituted by 1 to 2 R$^b$ independently selected groups; then: (a) the remaining R$^6$, R$^7$, R$^8$, R$^9$, and R$^{10}$ groups are not selected from C$_{3-6}$ cycloalkyl, phenyl, a 5- or 6-membered heteroatyl ring, and a 5- or 6-membered hetercycloalkyl ring; and (b) the remaining R$^6$, R$^7$, R$^8$, R$^9$, and R$^{10}$ adjacent groups, along with the carbons to which they are attached, do not form a fused phenyl ring or a 5- or 6-membered heteroaryl ring, each of which is optionally substituted by 1 to 2 R$^b$ independently selected groups.

BRIEF DESCRIPTION OF THE FIGURES

FIG. 1 depicts ORTEP crystallograph of tris(4,4'-dihydroxydibenzylideneacetone)dipalladium(0).

DETAILED DESCRIPTION OF THE INVENTION

The present invention provides palladium complexes of Formula I, which are useful for the Suzuki coupling reaction of small molecules and polymerizations. The complexes of Formula I have at least one moiety which is either charged or which can form a charged complex under the basic Suzuki coupling reaction conditions. For example, in some embodiments, the complex is tris(4,4'-dihydroxydibenzylideneacetone)dipalladium(0). Without wishing to be bound by a particular theory, it is believed that the basic conditions of the catalysis cause the phenolic proton of the ligand to be deprotonated, thus turning the moderately electron-donating hydroxy group into a strongly donating oxide. Evidence for the deprotonation (and subsequent aqueous partitioning) of the dba during the polymerization was provided by the fact that the aqueous phase turned orange as the reaction progressed. Since we believed strongly electron-donating groups on the dibenzylideneacetone (dba) ligands do not provide for stable complexes, it is thought that this pH switch turns a strong Pd(0) ligand into a weak one. Further, it is thought that the negative charge on the phenoxide groups causes the dba ligands to partition into the aqueous phase, allowing the catalysis to occur unhindered in the organic phase. This has enabled high yields and the formation of high molecular weight polymers using Suzuki polymerization.

Accordingly, in some embodiments, the present invention provides a palladium complex, or salt thereof, having at least one atom of palladium(0), at least one ligand of Formula Ia, and, optionally, one or more L$^1$;

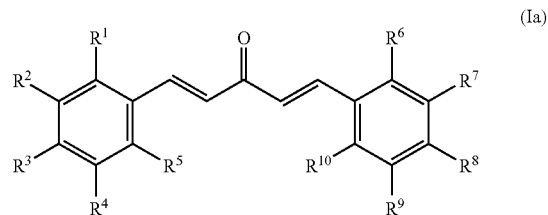

(Ia)

wherein:
L$^1$ is a ligand;
R$^1$, R$^2$, R$^3$, R$^4$, R$^5$, R$^6$, R$^7$, R$^8$, R$^9$, and R$^{10}$ are each independently selected from hydrogen, chloro, fluoro, cyano, nitro, C$_{1-4}$ alkyl, C$_{1-4}$ haloalkyl, C$_{1-4}$ alkoxy, C$_{1-4}$ haloalkoxy, C$_{1-4}$ non-terminal alkenyl, C$_{1-4}$ non-terminal alkynyl, amino, C$_{1-4}$ alkylamino, C$_{2-8}$ dialkylamino, C$_{3-6}$ cycloalkyl, phenyl, a 5- or 6-membered heteroaryl ring, a 5- or 6-membered hetercycloalkyl ring, hydroxyl, carboxy, quaternary salt of C$_{2-8}$ dialkylamino, HO—S(O)$_2$—, HO—S(O)—, (HO)$_2$P(O)—, C$_{1-4}$ alkylcarbonyloxy, C$_{1-4}$ haloalkylcarbonyloxy, C$_{1-4}$ alkyloxycarbonyl, C$_{1-4}$ haloalkyloxycarbonyl, tri(C$_{1-4}$ alkyl)silyloxy, tri(C$_{1-4}$ haloalkyl)silyloxy, and C$_{1-4}$ alkylene, wherein the C$_{1-4}$ alkylene is substituted by a moiety selected from C$_{1-4}$ alkoxy, C$_{1-4}$ haloalkoxy, carboxy, HO—S(O)$_2$—, HO—S(O)—, (HO)$_2$P(O)—, quaternary salt of C$_{2-8}$ dialkylamino, C$_{1-4}$ alkylcarbonyloxy, C$_{1-4}$ haloalkylcarbonyloxy, C$_{1-4}$ alkyloxycarbonyl, and C$_{1-4}$ haloalkyloxycarbonyl;

or two adjacent groups selected from R$^1$, R$^2$, R$^3$, R$^4$, and R$^5$, along with the carbons to which they are attached, form a fused phenyl ring or a 5- or 6-membered heteroaryl ring, each of which is optionally substituted by 1 to 2 independently selected R$^a$ groups;

or two adjacent groups selected from R$^6$, R$^7$, R$^8$, R$^9$, and R$^{10}$, along with the carbons to which they are attached, form a fused phenyl ring or a 5- or 6-membered heteroaryl ring, each of which is optionally substituted by 1 to 2 independently selected R$^b$ groups; and each R$^a$ and R$^b$ is independently selected from chloro, fluoro, cyano, nitro, C$_{1-4}$ alkyl, C$_{1-4}$ alkoxy, C$_{1-4}$ haloalkoxy, C$_{1-4}$ haloalkyl, hydroxyl, carboxy, di(C$_{1-4}$ alkyl)amino, HO—S(O)$_2$—, HO—S(O)—, (HO)$_2$P(O)—, C$_{1-4}$ alkylcarbonyloxy, C$_{1-4}$ haloalkylcarbonyloxy, C$_{1-4}$ alkyloxycarbonyl, C$_{1-4}$ haloalkyloxycarbonyl, tri(C$_{1-4}$ alkyl)silyloxy, and tri(C$_{1-4}$ haloalkyl)silyloxy;

with the five provisos that:
(1) at least one of R$^1$, R$^2$, R$^3$, R$^4$, R$^5$, R$^6$, R$^7$, R$^8$, R$^9$, and R$^{10}$ is independently selected from hydroxyl, carboxy, di(C$_{1-4}$ alkyl)amino, HO—S(O)$_2$—, HO—S(O)—, (HO)$_2$P(O)—, C$_{1-4}$ alkylcarbonyloxy, C$_{1-4}$ haloalkylcarbonyloxy, C$_{1-4}$ alkyloxycarbonyl, C$_{1-4}$ haloalkyloxycarbonyl, tri(C$_{1-4}$ alkyl)silyloxy, tri(C$_{1-4}$ haloalkyl)silyloxy, and C$_{1-4}$ alkylene, wherein the C$_{1-4}$ alkylene is substituted by a moiety selected from carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and (2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

It is recognized that the one or more palladium(0) metals can form a coordinate complex with the ligand of Formula Ia and ligand, $L^1$, in various ratios. In some embodiments, the ratio of the palladium(0) to the ligand of Formula Ia is 4:2, 3:2, 3:1, or 2:1. In some embodiments, the ratio of the palladium(0) to the ligand of Formula Ia to $L^1$ is 1:1:1, 1:2:1, or 1:1:2.

In some embodiments, $R^1$, $R^2$, $R^3$, $R^4$, $R^5$, $R^6$, $R^7$, $R^8$, $R^9$, and $R^{10}$ are each not selected from $C_{1-4}$ non-terminal alkenyl, $C_{1-4}$ non-terminal alkynyl, amino, $C_{1-4}$ alkylamino, and $C_{2-8}$ dialkylamino. In some embodiments, $R^1$, $R^2$, $R^3$, $R^4$, $R^5$, $R^6$, $R^7$, $R^8$, $R^9$, and $R^{10}$ are each not selected from $C_{1-4}$ non-terminal alkenyl, $C_{1-4}$ non-terminal alkynyl, amino, and $C_{1-4}$ alkylamino. In some embodiments, $R^1$, $R^2$, $R^3$, $R^4$, $R^5$, $R^6$, $R^7$, $R^8$, $R^9$, and $R^{10}$ are each not selected from $C_{1-4}$ non-terminal alkenyl and $C_{1-4}$ non-terminal alkynyl. In some embodiments, $R^1$, $R^2$, $R^3$, $R^4$, $R^5$, $R^6$, $R^7$, $R^8$, $R^9$, and $R^{10}$ are each not selected from amino, $C_{1-4}$ alkylamino, and $C_{2-8}$ dialkylamino.

In some embodiments, $R^1$, $R^2$, $R^3$, $R^4$, $R^5$, $R^6$, $R^7$, $R^8$, $R^9$, and $R^{10}$ are each not selected amino and $C_{1-4}$ alkylamino.

In some embodiments, at least one of the $R^1$, $R^2$, $R^3$, $R^4$, $R^5$, $R^6$, $R^7$, $R^8$, $R^9$, and $R^{10}$ group therefore, is a group which is charged or can become charged under the basic Suzuki coupling reaction conditions, such as hydroxyl, carboxy, di($C_{1-4}$ alkyl)amino, HO—S(O)$_2$—, HO—S(O)—, (HO)$_2$P(O)—, or quaternary salt of $C_{2-8}$ dialkylamino group; or a $C_{1-4}$ alkylene group substituted by a moiety selected from carboxy, HO—S(O)$_2$—, HO—S(O)—, (HO)$_2$P(O)—, and a quaternary salt of $C_{2-8}$ dialkylamino. Alternatively, in some embodiments, the salt form is isolated and used during the Suzuki coupling reaction or polymerization.

In some embodiments, the $R^1$, $R^2$, $R^3$, $R^4$, $R^5$, $R^6$, $R^7$, $R^8$, $R^9$, and $R^{10}$ group is a group which can be hydrolyzed under the Suzuki coupling reaction conditions to form a group which can then be deprotonated under the basic conditions, such as a $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, or tri($C_{1-4}$ haloalkyl)silyloxy group; or a $C_{1-4}$ alkylene group substituted by a moiety selected from $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy group. A fluoride base can be used to remove the ti($C_{1-4}$ alkyl)silyloxy, and tri($C_{1-4}$ haloalkyl)silyloxy group to give hydroxy groups which can then be deprotonated with additional base.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein the $C_{1-4}$ alkylene is substituted by a moiety selected from carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl, carboxy, and HO—S(O)$_2$—.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl and carboxy.

In some embodiments, at least of one of $R^1$, $R^2$, $R^3$, $R^4$, and $R^5$ and at least one of $R^6$, $R^7$, $R^8$, $R^9$, and $R^{10}$ are hydroxyl.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy.

In some embodiments, at least of one of $R^1$, $R^2$, $R^3$, $R^4$, and $R^5$ and at least one of $R^6$, $R^7$, $R^8$, $R^9$, and $R^{10}$ are each $C_{1-4}$ alkylcarbonyloxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkylcarbonyloxy, $C_{1-4}$ haloalkylcarbonyloxy, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkyloxycarbonyl, $C_{1-4}$ haloalkyloxycarbonyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkylcarbonyloxy, $C_{1-4}$ haloalkylcarbonyloxy, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkyloxycarbonyl, $C_{1-4}$ haloalkyloxycarbonyl, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkylcarbonyloxy, $C_{1-4}$ haloalkylcarbonyloxy, $C_{1-4}$ alkyl, and $C_{1-4}$ alkoxy.

In some embodiments, $R^1$, $R^2$, $R^3$, $R^4$, $R^5$, $R^6$, $R^7$, $R^8$, $R^9$, and $R^{10}$ groups are each independently selected from $C_{1-4}$ alkyloxycarbonyl, $C_{1-4}$ haloalkyloxycarbonyl, $C_{1-4}$ alkyl, and $C_{1-4}$ $C_{1-4}$ alkoxy.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein the $C_{1-4}$ alkylene is substituted by a moiety selected from carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and the remaining $R^1$, $R^2$, $R^3$, $R^4$, $R^5$, $R^6$, $R^7$, $R^8$, $R^9$, and $R^{10}$ groups are each independently selected from hydrogen, hydroxyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene; and the remaining $R^1$, $R^2$, $R^3$, $R^4$, $R^5$, $R^6$, $R^7$, $R^8$, $R^9$, and $R^{10}$ groups are each independently selected from hydrogen, hydroxyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl, carboxy, and HO—S(O)$_2$—; and the remaining $R^1$, $R^2$, $R^3$, $R^4$, $R^5$, $R^6$, $R^7$, $R^8$, $R^9$, and $R^{10}$ groups are selected from hydrogen, hydroxyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, at least of one of $R^1$, $R^2$, $R^3$, $R^4$, and $R^5$ and at least one of $R^6$, $R^7$, $R^8$, $R^9$, and $R^{10}$ are each independently selected from hydroxyl and carboxy; and the remaining $R^1$, $R^2$, $R^3$, $R^4$, $R^5$, $R^6$, $R^7$, $R^8$, $R^9$, and $R^{10}$ groups are each independently selected from hydrogen, hydroxyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, at least of one of $R^1$, $R^2$, $R^3$, $R^4$, and $R^5$ and at least one of $R^6$, $R^7$, $R^8$, $R^9$, and $R^{10}$ are hydroxyl; and the remaining $R^1$, $R^2$, $R^3$, $R^4$, $R^5$, $R^6$, $R^7$, $R^8$, $R^9$, and $R^{10}$ groups are each independently selected from hydrogen, hydroxyl, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, carboxy, —S(O)$_2$—OH, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, carboxy, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, carboxy, —S(O)$_2$—OH, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, carboxy, —S(O)$_2$—OH, chloro, fluoro, nitro, $C_{1-4}$ alkyl, and $C_{1-4}$ alkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, carboxy, chloro, fluoro, nitro, $C_{1-4}$ alkyl, and $C_{1-4}$ alkoxy.

In some embodiments, $R^1$, $R^2$, $R^3$, $R^4$, $R^5$, $R^6$, $R^7$, $R^8$, $R^9$, and $R^{10}$ groups are each independently selected from carboxy, chloro, fluoro, nitro, $C_{1-4}$ allyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from —S(O)$_2$—OH, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydroxyl, $C_{1-4}$ alkyl, and $C_{1-4}$ alkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, carboxy, —S(O)$_2$—OH, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, carboxy, chloro, fluoro, cyano, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, carboxy, —S(O)$_2$—OH, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, carboxy, —S(O)$_2$—OH, chloro, fluoro, nitro, $C_{1-4}$ alkyl, and $C_{1-4}$ alkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, carboxy, chloro, fluoro, nitro, $C_{1-4}$ alkyl, and $C_{1-4}$ alkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, carboxy, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, —S(O)$_2$—OH, chloro, fluoro, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, nitro, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, $C_{1-4}$ alkyl, $C_{1-4}$ haloalkyl, $C_{1-4}$ alkoxy, and $C_{1-4}$ haloalkoxy.

In some embodiments, $R^1$, $R^2$, $R^3$, $R^4$, $R^5$, $R^6$, $R^7$, $R^8$, $R^9$, and $R^{10}$ groups are each independently selected from hydrogen, hydroxyl, $C_{1-4}$ alkyl, and $C_{1-4}$ alkoxy.

In some embodiments, at least one of $R^1$, $R^2$, $R^3$, $R^4$, and $R^5$ are hydrogen and at least one of $R^6$, $R^7$, $R^8$, $R^9$, and $R^{10}$ are hydrogen. In some embodiments, at least two of $R^1$, $R^2$, $R^3$, $R^4$, and $R^5$ are hydrogen and at least two of $R^6$, $R^7$, $R^5$, $R^9$, and $R^{10}$ are hydrogen. In some embodiments, at least three of $R^1$, $R^2$, $R^3$, $R^4$, and $R^5$ are hydrogen and at least three of $R^6$, $R^7$, $R^8$, $R^9$, and $R^{10}$ are hydrogen. In some embodiments, at least four of $R^1$, $R^2$, $R^3$, $R^4$, and $R^5$ are hydrogen and at least four of $R^6$, $R^7$, $R^8$, $R^9$, and $R^{10}$ are hydrogen.

In some embodiments, $L^1$ is a phosphine or phosphine equivalent ligand. In some embodiments, each $L^1$ is independently selected from trimethylphosphine, triethylphosphine, tripropylphosphine, triisopropylphosphine, tributylphosphine, tricyclohexylphosphine, tri(t-butyl)phosphine, 1,1'-bis(diphenylphosphino)ferrocene, 1,1'-bis(di-t-butylphosphino)ferrocene, 1'-(di-t-butylphosphino)-1,2,3,4,5-pentaphenylferrocene, tri(2-furyl)phosphine, 2-(di-t-butylphosphino)biphenyl, 2-(dicyclohexyl)biphenyl, butyldi-1-adamantylphosphine, 2,2'-bis(diphenylphosphino)-1,1'-binaphthyl, tri(p-tolyl)phosphine, trimethyl phosphite, triethyl phosphite, tripropyl phosphite, triisopropyl phosphite, tributyl phosphite, tris(2,4-di-t-butylphenyl) phosphite, tricyclohexyl phosphite, triphenylphosphine, tri (o-tolyl)phosphine, triisopropylphosphine, an N-heterocyclic carbene ligand, and disubstituted 1,4-diaza-1,3-butadiene. In some embodiments, the phosphine is tri(o-tolyl)phosphine. In some embodiments the phosphine is a phosphine-equivalent, such as an N-heterocyclic carbene ligand (e.g. that generated in situ from 1,3-bis(2,4,6-trimethylphenyl)ibidazolium chloride or other salt thereof, or generated in situ form 1,3-bis(2,6-diisopropylphenyl)imidizolium chloride or other salt thereof), or disubstituted 1,4-diaza-1,3-butadiene (e.g. 1,4-dicyclohexyl-1,4-diaza-1,3-butadiene). Appropriate carbene ligands include, but are not limited to, those in Hillier, A. C.; Grasa, G. A.; Viciu, M. S.; Lee, H. M.; Yang, C.; Nolan, S. P., *J. Organomet. Chem.* 2002, 653, 69-82, which is incorporated herein by reference in its entirety. Appropriate 1,4-diazabutidene ligands include, but are not limited to, those in Grasa, G. A.; Hillier, A. C.; Nolan, S, P., *Org. Lett.* 2001, 3, 1077-1080, which is incorporated herein by reference in its entirety.

In some embodiments, each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, $C_{1-4}$ alkylcarbonyloxy, and $C_{1-4}$ haloalkylcarbonyloxy. In some embodiments, each $R^a$ and $R^b$ is independently selected from chloro, fluoro, cyano, nitro, $C_{1-4}$ alkyl, $C_{1-4}$ alkoxy, hydroxyl, and carboxy. In some embodiments, each $R^a$ and $R^b$ is independently selected from chloro, fluoro, $C_{1-4}$ alkyl, $C_{1-4}$ alkoxy, hydroxyl, and carboxy. In some embodiments, each $R^a$ and $R^b$ is independently selected from $C_{1-4}$ alkyl, $C_{1-4}$ alkoxy, and hydroxyl. In some embodiments, each $R^a$ and $R^b$ is independently selected from $C_{1-4}$ alkoxy and hydroxyl.

In some embodiments, two adjacent groups selected from $R^1$, $R^2$, $R^3$, $R^4$, and $R^5$, along with the carbons to which they are attached, do not form a fused phenyl ring or a 5- or 6-membered heteroaryl ring; and two adjacent groups selected from $R^6$, $R^7$, $R^8$, $R^9$, and $R^{10}$, along with the carbons to which they are attached, do not form a fused phenyl ring or a 5- or 6-membered heteroaryl ring.

In some embodiments, the complex is of Formula I:

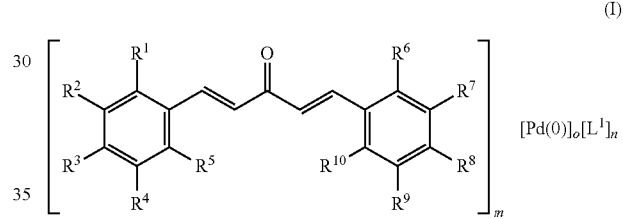

(I)

or salt thereof,
wherein:
n is from 0 to 2;
m is from 1 to 4;
o is from 1 to 2; and
wherein $R^1$, $R^2$, $R^3$, $R^4$, $R^5$, $R^6$, $R^7$, $R^8$, $R^9$, $R^{10}$ $R^a$, and $R^b$ are defined as for any of the embodiments described herein.

In some embodiments, m is 1, n is 1, and o is from 1. In some embodiments, m is 2, n is 1, and o is from 1. In some embodiments, m is 1, n is 2, and o is from 1. In some embodiments, m is 2, n is 0, and o is 1. In some embodiments, m is 3, n is 0, and o is 1. In some embodiments, m is 3, n is 0, and o is 2. In some embodiments, m is 4, n is 0, and o is 2. In some embodiments, m is 2, n is 0, and o is 1. In some embodiments, m is 3 and o is 1. In some embodiments, m is 3 and o is 2. In some embodiments, m is 4 and o is 2. In some embodiments, m is 2 and o is 1. In some embodiments, n is 3, m is 0, and o is 1 or 2. In some embodiments, n is 3 or 4, m is 0, and o is 1 or 2.

In some embodiments, the palladium complex is selected from:
tris(4,4'-dihydroxydibenzylideneacetone)dipalladium(0);
tris(4,4'-dihydroxydibenzylideneacetone)palladium(0);
bis(4,4'-dihydroxydibenzylideneacetone)palladium(0);
tetrakis(4,4'-dihydroxydibenzylideneacetone)dipalladium (0);
tris(4,4'-di(acetyloxy)dibenzylideneacetone)dipalladium (0);
bis(4,4'-di(acetyloxy)dibenzylideneacetone)palladium (b);

tetrakis(4,4'-di(acetyloxy)dibenzylideneacetone)dipalladium(0); and tris(4,4'-di(acetyloxy)dibenzylideneacetone)palladium(0);

or salt thereof.

The complexes of the invention include the solvate adducts. The most common solvents used to recrystallize Pd-dba complexes (and are thus most likely to be incorporated as solvates in the crystal structure) are: benzene, toluene, chloroform, dichloromethane, THF. In some embodiments, the solvate is formed from dimethoxyethane, dioxane, and diethyl ether. Other common solvents which may form adducts palladium complexes are known in the art.

The palladium complexes may also form salts formed by the addition of an acid or base to a compound disclosed herein. Generally, the complexes of the invention with acidic groups (or groups that become acidic upon hydrolysis or treatment with fluoride atom) can react with bases. Acceptable salts, including mono- and bi-salts, include those derived from alkali metal bases, alkaline earth metal bases, and other useful bases. Acceptable salts, including mono- and bi- salts, include, but are not limited to, those derived from organic and inorganic acids such as, but not limited to, acetic, lactic, citric, cinnamic, tartaric, succinic, fumaric, maleic, malonic, mandelic, malic, oxalic, propionic, hydrochloric, hydrobromic, phosphoric, nitric, sulfuric, glycolic, pyruvic, methanesulfonic, ethanesulfonic, toluenesulfonic, salicylic, benzoic, and similarly known acceptable acids.

The complexes in this invention may contain one or more asymmetric centers, which can thus give rise to optical isomers (enantiomers) and diastereomers. While shown without respect to the stereochemistry in Formula I, the present invention includes such optical isomers (enantiomers) and diastereomers (geometric isomers); as well as the racemic and resolved, enantiomerically pure R and S stereoisomers; as well as other mixtures of the R and S stereoisomers and pharmaceutically acceptable salts thereof.

One skilled in the art will also recognize that it is possible for tautomers to exist for the complexes of the present invention. The present invention includes all such tautomers even though not shown in the formulas herein.

Complexes of the invention can also include all isotopes of atoms occurring in the intermediates or final compounds. Isotopes include those atoms having the same atomic number but different mass numbers. For example, isotopes of hydrogen include tritium and deuterium.

At various places in the present specification, substituents of compounds of the invention are disclosed in groups or in ranges. It is specifically intended that the invention include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

For compounds of the invention in which a variable appears more than once, each variable can be a different moiety independently selected from the group defining the variable. For example, where a structure is described having two R groups that are simultaneously present on the same compound; the two R groups can represent different moieties independently selected from the group defined for R. In another example, when an optionally multiple substituent is designated in the form:

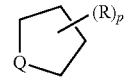

then it is understood that substituent R can occur p number of times on the ring, and R can be a different moiety at each occurrence. Further, in the above example, should the variable Q be defined to include hydrogens, such as when Q is the to be $CH_2$, NH, etc., any floating substituent such as R in the above example, can replace a hydrogen of the Q variable as well as a hydrogen in any other non-variable component of the ring.

The term "n-membered" where n is an integer typically describes the number of ring-forming atoms in a moiety where the number of ring-forming atoms is n. For example, piperidinyl is an example of a 6-membered heterocycloalkyl ring and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substitutent. It is understood that substitution at a given atom is limited by valency. Examples of suitable substituents include, but are not limited to halogen, CN, nitro, $NH_2$, OH, SO, $SO_2$, COOH, $OC_{1-6}$alkyl, alkenyl, alkynyl, haloalkenyl, haloalkynyl, $CH_2OH$, $SO_2H$, $C_{1-6}$alkyl, $OC_{1-6}$alkyl, $C_{1-6}$haloalkyl, $OC_{1-6}$haloalkyl, aryl, arylalkyl, aryloxy, heteroaryl, heteroarylalkyl, heteroaryloxy, cycloakyl, cycloalkylalkyl, cycloalkyloxy, heterocycloalkyl, heterocycloalkylalkyl, hetereocycloalkyloxy, $C(=O)C_{1-6}$alkyl, $C(=O)OC_{1-6}$alkyl, $C(=O)NH_2$, $C(=O)NHC_{1-6}$alkyl, $C(=O)N(C_{1-6}$alkyl)2, $SO_2C_{1-6}$alkyl, $SO_2NHC_{1-6}$alkyl, $SO_2N(C_{1-6}$alkyl$)_2$, $NH(C_{1-6}$alkyl), $N(C_{1-6}$alkyl$)_2$, $NHC(=O)C_{1-6}$alkyl, $NC(=O)(C_{1-6}$alkyl$)_2$, $C_{5-6}$aryl, $OC_{5-6}$aryl, $C(=O)C_{5-6}$aryl, $C(=O)OC_{5-6}$aryl, $C(=O)NHC_{5-6}$aryl, $C(=O)N(C_{5-6}$aryl$)_2$, $SO_2C_{5-6}$aryl, $SO_2NHC_{5-6}$aryl, $SO_2N(C_{5-6}$aryl$)_2$, $NH(C_{5-6}$aryl), $N(C_{5-6}$aryl$)_2$, $NC(=O)C_{5-6}$aryl, $NC(=O)(C_{5-6}$aryl$)_2$, $C_{5-6}$heterocyclyl, $OC_{5-6}$heterocyclyl, $C(=O)C_{5-6}$heterocyclyl, $C(=O)OC_{5-6}$heterocyclyl, $C(=O)NHC_{5-6}$heterocyclyl, $C(=O)N(C_{5-6}$heterocyclyl)2, $SO_2C_{5-6}$heterocyclyl, $SO_2NHC_{5-6}$heterocyclyl, $SO_2N(C_{5-6}$heterocyclyl$)_2$, $NH(C_{5-6}$heterocyclyl), $N(C_{5-6}$heterocyclyl$)_2$, $NC(=O)C_{5-6}$heterocyclyl, and $NC(=O)(C_{5-6}$heterocyclyl$)_2$.

As used herein, the term "alkyl", employed alone or in combination with other terms, refers to a saturated hydrocarbon group that may be straight-chain or branched. In some embodiments, the alkyl group has 1 to 4, 2 to 4, 3 to 4, 3 to 6, 1 to 3 or 1 to 2 carbon atoms. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, n-heptyl, n-octyl, and the like.

As used herein, the term "amino" refers to a group of formula —$NH_2$.

As used herein, the term "alkylamino" refers to a group of formula —NH(alkyl). In some embodiments, the alkyl group has 1 to 4, 2 to 4, 3 to 4, 3 to 6, 1 to 3 or 1 to 2 carbon atoms.

As used herein, the term "dialkylamino" refers to a group of formula —N(alkyl)$_2$. The prefix "$C_{2-8}$" refers to the total number of carbon atoms in the entire —N(alkyl)2 moiety, rather than the number in one of the alkyl groups. In some embodiments, each alkyl group has 1 to 4, 2 to 4, 3 to 4, 3 to 6, 1 to 3 or 1 to 2 carbon atoms.

As used herein, the term "alkylene" refers to a divalent alkyl linking group. Examples of alkylene groups include, but are not limited to, methan-1,1-diyl, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene group has 1 to 4, 2 to 4, 3 to 4, 3 to 6, 1 to 3, or 1 to 2 carbon atoms.

As used herein, "alkenyl", employed alone or in combination with other terms, refers to an alkyl group having one or more double carbon-carbon bonds. In some embodiments, the alkenyl moiety contains 2 to 4 carbon atoms.

As used herein, "alkynyl", employed alone or in combination with other terms, refers to an alkyl group having one or more triple carbon-carbon bonds. In some embodiments, the alkynyl moiety contains 2 to 4 carbon atoms.

As used herein, "non-terminal alkenyl", employed alone or in combination with other terms, refers to an alkyl group having one or more double carbon-carbon bonds, where the double bond is not in the terminal position (opposite end from the linker) of the moiety (for example, an alkenyl group having a double bond in the terminal position includes —$CH_2$—C=CH, and —$CH_2CH_2$—C=CH). In some embodiments, the alkenyl moiety contains 2 to 4 carbon atoms.

As used herein, "non-terminal alkynyl", employed alone or in combination with other terms, refers to an alkyl group having one or more triple carbon-carbon bonds, where the triple bond is not in the terminal position (opposite end from the linker) of the moiety. In some embodiments, the alkynyl moiety contains 2 to 4 carbon atoms.

As used herein, the term "alkoxy", employed alone or in combination with other terms, refers to an group of formula —O-alkyl. Example alkoxy groups include methoxy, ethoxy, propoxy (e.g., n-propoxy and isopropoxy), t-butoxy, and the like. In some embodiments, the alkoxy group has 1 to 4, 2 to 4, 3 to 4, 3 to 6, 1 to 3 or 1 to 2 carbon atoms.

As used herein, the term "alkyloxycarbonyl" refers to a group of formula —C(O)O-(alkyl). In some embodiments, the alkyl group has 1 to 4, 2 to 4, 3 to 4, 3 to 6, 1 to 3 or 1 to 2 carbon atoms.

As used herein, the term "haloalkyloxycarbonyl" refers to a group of formula —C(O)O-(haloalkyl). In some embodiments, the haloalkyl group has 1 to 4, 2 to 4, 3 to 4, 3 to 6, 1 to 3 or 1 to 2 carbon atoms.

As used herein, the term "carboxy" refers to a group of formula —C(O)OH.

As used herein, the term "cycloalkyl", employed alone or in combination with other terms, refers to a non-aromatic cyclic hydrocarbon moiety, which may optionally contain one or more alkenylene or alkynylene groups as part of the ring structure. Example cycloalkyl groups include cyclopropyl, cyclobutyl, cyclopentyl, cyclohexyl, and the like.

As used herein, the term "cyano" refers to a group of formula —CN, wherein the carbon and nitrogen atoms are bound together by a triple bond.

As used herein, "haloalkoxy", employed alone or in combination with other terms, refers to a group of formula —O-haloalkyl. In some embodiments, the haloalkoxy group has 1 to 4, 2 to 4, 3 to 4, 3 to 6, 1 to 3 or 1 to 2 carbon atoms. In some embodiments, the haloalkoxy group contains only fluorine atoms. An example haloalkoxy group is $OCF_3$.

As used herein, the term "haloalkyl", employed alone or in combination with other terms, refers to an alkyl group having from one halogen atom to 2n+1 halogen atoms which may be the same or different, where "n" is the number of carbon atoms in the alkyl group. In some embodiments, the haloalkyl group has 1 to 4, 2 to 4, 3 to 4, 3 to 6, 1 to 3 or 1 to 2 carbon atoms. In some embodiments, the haloalkyl group contains only fluorine atoms.

As used herein, the terms "halo" and "halogen", employed alone or in combination with other terms, refer to fluoro, chloro, bromo, and iodo.

As used herein, the term "heteroaryl", "heteroaryl ring", or "heteroaryl group", employed alone or in combination with other terms, refers to a monocyclic aromatic hydrocarbon moiety, having one or more heteroatom ring members selected from nitrogen, sulfur and oxygen. When the heteroaryl group contains more than one heteroatom ring member, the heteroatoms may be the same or different. Example heteroaryl groups include, but are not limited to, pyrrolyl, azolyl, oxazolyl, thiazolyl, imidazolyl, furyl, thienyl, or the like.

As used herein, the term "heterocycloalkyl", "heterocycloalkyl ring", or "heterocycloalkyl group", employed alone or in combination with other terms, refers to non-aromatic ring system, which may optionally contain one or more alkenylene or alkynylene groups as part of the ring structure, and which has at least one heteroatom ring member selected from nitrogen, sulfur and oxygen. When the heterocycloalkyl groups contains more than one heteroatom, the heteroatoms may be the same or different. Heterocycloalkyl groups can include mono-ring systems. In some embodiments, the heterocycloalkyl group has 5 to 6 ring-forming atoms, 5 to 7 ring-forming atoms, or about 3 to 8 ring forming atoms. The carbon atoms or hetereoatoms in the ring(s) of the heterocycloalkyl group can be oxidized to form a carbonyl, or sulfonyl group (or other oxidized linkage) or a nitrogen atom can be quaternized.

As used herein, the term "hydroxyl" refers to a group of formula —OH.

As used herein, the term "nitro" refers to a group of formula —$NO_2$.

As used herein, the term "quaternary salt of $C_{2-8}$ dialkylamino" refers to the quaternized salt of the dialkylamino group, wherein a third $C_{1-4}$ alkyl group is bound to the nitrogen atom forming a salt. Any suitable counterion is appropriate, including, but not limited to a halide ion. Processes for forming quaternary ammonium salts are well-known in the art (e.g, the use of methyl iodide or other alkylating agent).

As used herein, the term "alkylcarbonyloxy" refers to a group of formula —OC(O)(alkyl). In some embodiments, the alkyl group has 1 to 4, 2 to 4, 3 to 4, 3 to 6, 1 to 3 or 1 to 2 carbon atoms.

As used herein, the term "haloalkylcarbonyloxy" refers to a group of formula —OC(O)(haloalkyl). In some embodiments, the haloalkyl group has 1 to 4, 2 to 4, 3 to 4, 3 to 6, 1 to 3 or 1 to 2 carbon atoms.

As used herein, the term "tri($C_{1-4}$ alkyl)silyloxy" refers to a group of formula —OSi($C_{1-4}$ alkyl)$_3$. In some embodiments, the alkyl group has 1 to 4, 2 to 4, 3 to 4, 3 to 6, 1 to 3 or 1 to 2 carbon atoms.

As used herein, the term "tri($C_{1-4}$ haloalkyl)silyloxy" refers to a group of formula —OSi($C_{1-4}$ haloalkyl)$_3$. In some embodiments, the haloalkyl group has 1 to 4, 2 to 4, 3 to 4, 3 to 6, 1 to 3 or 1 to 2 carbon atoms.

As used herein, the term "adjacent groups" means that the two "R" substituents are on neighboring carbons of one of the phenyl rings in the structure of Formula Ia.

In some embodiments, the present invention provides the product of process comprising reacting palladium(II) with a ligand of Formula Ia, or salt thereof, and sodium acetate in an alcohol solvent in the presence of oxygen, wherein:

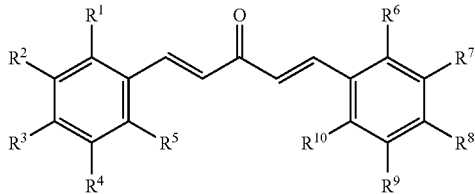

wherein:

$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alklylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein the $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 independently selected $R^a$ groups;

or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 independently selected $R^b$ groups; and each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy;

with the five provisos that:

(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$alkyl)amino, HO—S(O)$_2$—, HO—S(O)—, (HO)$_2$P(O)—, $C_{1-4}$alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein the $C_{1-4}$ alkylene is substituted by a moiety selected from carboxy, HO—S(O)$_2$—, HO—S(O)—, (HO)$_2$P(O)—, quaternary salt of $C_{2-9}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and (2) if one of $R^1$, $R^2$, $R^3$, $R^4$, and $R^5$ is selected from $C_{3-6}$ cycloalkyl, phenyl, a 5- or 6-heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

In some embodiments, the temperature is about 40 to 50° C.

Processes and Reaction Mixtures

The present invention further provides process for preparing a diaromatic compounds and polymerization processes. The polymerization processes and processes for producing diaromatic compounds are Suzuki polymerization and coupling reactions which are well-known in the art. The processes utilizing the palladium complexes of the invention provide improved yields and molecular weights in the polymers produced, due to the palladium complexes used.

Accordingly, the present invention further provides a process for preparing a diaromatic compound, comprising mixing a palladium complex of the invention, an aromatic substrate having one group selected from bromo, iodo, tosylate, benzenesulfonate, mesylate, triflate, and chloro, an aromatic boronate having one group selected from boronic acid, boronic ester, and borane, a base, a ligand, an organic solvent, and water and reacting under conditions sufficient to form the diaromatic compound.

Accordingly, the present invention further provides a process for preparing a diaromatic compound, comprising mixing a palladium complex of the invention, or any of the embodiments herein, with a composition comprising one or more materials selected from an aromatic substrate having one group selected from bromo, iodo, tosylate, benzenesulfonate, mesylate, triflate, and chloro, an aromatic boronate having one group selected from boronic acid, boronic ester, and borane, a base, a ligand, an organic solvent, and water;

and after the mixing, adding the remaining one or more materials and reacting under conditions sufficient to form a diaromatic compound.

Further, in some embodiments, the present invention provides a process for preparing a compound, comprising mixing a palladium complex of the invention, an aromatic substrate or vinyl substrate, each having one group selected from bromo, iodo, tosylate, benzenesulfonate, mesylate, triflate, and chloro, an aromatic boronate, vinyl boronate, or alkyl boronate, each having one group selected from boronic acid, boronic ester, and borane, a base, a ligand, an organic solvent, and water and reacting under conditions sufficient to form the diaromatic compound.

As used herein, the term "aromatic substrate", as used in this context, refers to any aromatic moiety which can be used for a Suzuki coupling reaction, having an aryl or heteroaryl moiety, wherein the aromatic moiety has one group selected from bromo, iodo, tosylate, benzenesulfonate, mesylate, triflate, and chloro, which is attached to the aryl or heteroaryl moiety, and which can be optionally substituted. Many aromatic substrates can be used (see e.g., Suzuki, A., J. Organomet. Chem. 2002, 653, 83; Miyaura, N., Top. Curr. Chem. 2002, 219, 12; Suzuki, A., in Handbook of Organopalladium Chemistry for Organic Synthesis, Negishi, E., Ed.; John Wiley & Sons, Inc.: Hoboken, N.J., 2002; Vol. 1, p. 249).

As used herein, the term "aromatic boronate", as used in this context, refers to any aromatic moiety which can be used for a Suzuki coupling reaction, having an aryl or heteroaryl moiety, wherein the aromatic moiety has one group selected from boronic acid, boronic ester, and borane, which is attached to the aryl or heteroaryl moiety, and which can be optionally substituted. Many aromatic boronates can be used (see e.g., Suzuki, A., J. Organomet. Chem. 2002, 653, 83; Miyaura, N., Top. Curr. Chem. 2002, 219, 12; Suzuki, A., in Handbook of Organopalladium Chemistry for Organic Synthesis, Negishi, E., Ed.; John Wiley & Sons, Inc.: Hoboken, N.J., 2002; Vol. 1, p. 249).

As used herein, the term "vinyl boronate", as used in this context, refers to an alkenyl moiety which may be optionally substituted, which can be used for a Suzuki coupling reaction, wherein the alkenyl moiety has a group attached to the double bond, wherein the group is selected from boronic acid, boronic ester, and borane, which can be optionally substituted.

As used herein, the term "vinyl substrate", as used in this context, refers to an alkenyl moiety which may be optionally substituted, which can be used for a Suzuki coupling reaction, wherein the alkenyl moiety has a group attached to the double bond, wherein the group is selected from bromo, iodo, tosylate, benzenesulfonate, mesylate, triflate, and chloro, which can be optionally substituted.

As used herein, the term "alkyl boronate", as used in this context, refers to an alkyl moiety which may be optionally substituted, which can be used for a Suzuki coupling reaction, wherein the alkyl moiety is substituted by a group selected from boronic acid, boronic ester, and borane, which can be optionally substituted.

As used herein, the term "diaromatic compound" refers to the product of the Suzuki coupling of the aromatic boronate and the aromatic substrate.

As used herein, the term "aryl moiety", used in this context, refers to a monocyclic or polycyclic (e.g., having 2, 3 or 4 fused or covalently linked rings) aromatic hydrocarbon moiety, such as, but not limited to, phenyl, 1-naphthyl, 2-naphthyl, anthracenyl, phenanthrenyl, and the like, which may be optionally substituted. In some embodiments, aryl groups have from 6 to 20 carbon atoms, about 6 to 10 carbon atoms, or about 6 to 8 carbons atoms.

As used herein, the term "heteroaryl moiety", used in this context, refers to a monocyclic or polycyclic (e.g., having 2, 3 or 4 fused or covalently linked rings) aromatic hydrocarbon moiety, having one or more heteroatom ring members selected from nitrogen, sulfur and oxygen. When the heteroaryl group contains more than one heteroatom ring member, the heteroatoms may be the same or different. Example heteroaryl groups include, but are not limited to, pyrrolyl, azolyl, oxazolyl, thiazolyl, imidazolyl, furyl, thienyl, quinolinyl, isoquinolinyl, indolyl, benzothienyl, benzofuranyl, benzisoxazolyl, imidazo[1,2-b]thiazolyl or the like. In some embodiments, the heteroaryl group has 5 to 10 carbon atoms.

While not wishing to be bound by any theory, in some embodiments, the processes provide diaromtic compounds in a higher yield and/or purity because of the better delivery of the palladium(0) metal into the catalytic cycle, provided by the palladium complexes of the invention. In some embodiments, the processes provide diaromtic compounds starting from aromatic chlorides as the aromatic substrate. Aromatic chlorides can be obtained at lower cost than the other aromatic substrates having from bromo, iodo, tosylate, benzenesulfonate, mesylate, and triflate groups.

The coupling processes for making the diaromatic compounds can be carried out using typical Suzuki reaction conditions, but using the palladium complexes of the invention as the palladium source (for a review, see Suzuki, A., J. Organomet. Chem. 2002, 653, 83; Miyaura, N., Top. Curr. Chem. 2002, 219, 12; Suzuki, A., in Handbook of Organopalladium Chemistry for Organic Synthesis, Negishi, E., Ed.; John Wiley & Sons, Inc.: Hoboken, N.J., 2002; Vol. 1, p. 249).

As used herein, the term "composition" refers to either a mixture of materials or a single material.

In some embodiments, the group on the aromatic substrate is selected from bromo, iodo, tosylate, benzenesulfonate, mesylate, triflate, and chloro. In some embodiments, the group on the aromatic substrate is selected from bromo, iodo, tosylate, benzenesulfonate, mesylate, and triflate. In some embodiments, the group on the aromatic substrate is selected from bromo, iodo, and chloro. In some embodiments, the group on the aromatic substrate is selected from bromo and iodo.

In some embodiments, the aromatic substrate has an aryl moiety substituted by one group selected from bromo, iodo, tosylate, benzenesulfonate, mesylate, triflate, and chloro; and the aromatic boronate has an aryl moiety substituted by one group selected from boronic acid, boronic ester, and borane. In some embodiments, the aromatic substrate has a phenyl ring substituted by one group selected from bromo, iodo, tosylate, benzenesulfonate, mesylate, triflate, and chloro; and the aromatic boronate has a phenyl ring substituted by one group selected from boronic acid, boronic ester, and borane. In some embodiments, the aromatic substrate has an aryl moiety substituted by one group selected from bromo, iodo, and chloro; and the aromatic boronate having an aryl moiety substituted by one group selected from boronic acid, and boronic ester. In some embodiments, the aromatic substrate has a phenyl ring substituted by one group selected from bromo, iodo, and chloro; and the aromatic boronate has a phenyl ring substituted by one group selected from boronic acid and boronic ester. In some embodiments, the aromatic substrate has an aryl moiety substituted by one group selected from bromo and iodo; and the aromatic boronate having an aryl moiety substituted by one group selected from boronic acid, and boronic ester. In some embodiments, the aromatic substrate has a phenyl ring substituted by one group selected from bromo and iodo; and the aromatic boronate has a phenyl ring substituted by one group selected from boronic acid and boronic ester.

In some embodiments, the ligand is selected from trimethylphosphine, triethylphosphine, tripropylphosphine, triisopropylphosphine, tributylphosphine, tricyclohexylphosphine, tri(t-butyl)phosphine, 1,1'-bis(diphenylphosphino)ferrocene, 1,1'-bis(di-t-butylphosphino)ferrocene, 1'-(di-t-butylphosphino)-1,2,3,4,5-pentaphenylferrocene, tri(2-furyl)phosphine, 2-(di-t-butylphosphino)biphenyl, 2-(dicyclohexyl)biphenyl, butyldi-1-adamantylphosphine, 2,2'-bis(diphenylphosphino)-1,1'-binaphthyl, tri(p-tolyl)phosphine, trimethyl phosphite, triethyl phosphite, tripropyl phosphite, triisopropyl phosphite, tributyl phosphite, tris(2,4-di-t-butylphenyl)phosphite, tricyclohexyl phosphite, triphenylphosphine, tri(o-tolyl)phosphine, and triisopropylphosphine. In some embodiments, the ligand is tri(o-tolyl)phosphine and triphenylphosphine. In some embodiments, the ligand is tri(o-tolyl)phosphine.

Suitable organic solvents include, but are not limited to, dichloromethane, chloroform, toluene, benzene, THF, dimethoxyethane, dioxane, dimethylacetamide, dimethylsulfoxide, and dimethylformamide. Other other solvents for Suzuki coupling are known in the art.

In some embodiments, the molar ratio of ligand to palladium metal is from 1:1 to 2:1.

In some embodiments, the conditions sufficient to form a diaromatic compound comprise heating to a temperature of from about 30 to about 120° C. In some embodiments, the conditions sufficient to form a diaromatic compound comprise heating to a temperature of from about 30 to about 80° C. In some embodiments, the conditions sufficient to form a diaromatic compound comprise heating to a temperature of from about 30 to about 120° C. for about 0.5 hours to about 48 hours. In some embodiments, the conditions sufficient to form a diaromatic compound comprise heating to a temperature of from about 30 to about 80° C. for about 0.5 hours to about 24 hours. In some embodiments, the conditions sufficient to form a diaromatic compound comprise heating to a temperature of about 50° C. for about 24 hours to about 100 hours, or about 72 hours.

In some embodiments, the base used in the reaction may be an inorganic base such as an alkaline earth carbonate or bicarbonate or an organic base, such as those organic bases disclosed in WO00/53656, including alkyl ammonium hydroxides, alkyl ammonium carbonates, alkyl ammonium biscarbonates, alkylammonium borates, 1,5-diazabicyclo[4.3.0]non-5-ene (DBN), 1,8-diazabicyclo[5.4.0]undec-7-ene (DBU), 1,4-diazabicyclo[2.2.2]octane (DABCO), dimethylaminopyridine (DMAP), pyridine, trialkylamines and alkylammonium fluorides such as tetraalkylammonium fluorides. In some embodiments, the base is a tetraalkyl ammonium hydroxide such as tetramethyl ammonium hydroxide, tetraethyl ammonium hydroxide or tetra-n-propyl ammonium hydroxide. In some embodiments, the base is selected from an alkali carbonate, an alkali bicarbonate, an alkaline earth carbonate, an alkaline earth bicarbonate, an organic base, an alkali phosphate, an alkali fluoride, an alkaline earth fluoride, and an alkaline earth phosphate.

Generally, in some embodiments, enough base is used so as to deprotonate the base labile groups or acidic groups on the palladium complex, such as the hydroxyl groups, or to facilitate the hydroxylsis of the protected groups on the complex such as the $C_{1-4}$ alkylcarbonyloxy groups. Additionally, in some embodiments, the base is usually added in a quantity sufficient to convert the boron derivative functional groups into $—B(OH)_3$ or $—BF_3$ anionic groups depending on the particular base selected.

Any of the aromatic substrates, aromatic diboronates, ligands, solvents, bases, conditions, and palladium complexes described herein can combined in any suitable combination to perform the coupling processes of the invention.

The present invention further provides a polymerization process comprising mixing a palladium complex of the invention, or any embodiment described herein, with an aromatic substrate having two groups independently selected from bromo, iodo, tosylate, benzenesulfonate, mesylate, triflate, and chloro, an aromatic diboronate having two groups independently selected from boronic acid, boronic ester, and borane, a base, a ligand, a organic solvent and water; and reacting under conditions sufficient to form a polymer.

The present invention further provides a polymerization process comprising mixing a palladium complex of the invention, or any embodiment described herein, with a composition comprising one or more materials selected from an aromatic substrate having two groups independently selected from bromo, iodo, tosylate, benzenesulfonate, mesylate, triflate, and chloro, an aromatic diboronate having two groups independently selected from boronic acid, boronic ester, and borane, a base, a ligand, a organic solvent and water; and after the mixing, adding the remaining one or more materials and reacting under conditions sufficient to form a polymer.

In some embodiments, each group on the aromatic substrate is independently selected from bromo, iodo, tosylate, benzenesulfonate, mesylate, triflate, and chloro. In some embodiments, each group on the aromatic substrate is independently selected from bromo, iodo, tosylate, benzenesulfonate, mesylate, and triflate. In some embodiments, each group on the aromatic substrate is independently selected from bromo, iodo, and chloro. In some embodiments, each group on the aromatic substrate is independently selected from bromo and iodo.

In some embodiments, the aromatic substrate has an aryl moiety substituted by two groups independently selected from bromo, iodo, tosylate, benzenesulfonate, mesylate, triflate, and chloro; and the aromatic diboronate has an aryl moiety substituted by two groups independently selected from boronic acid, boronic ester, and borane. In some embodiments, the aromatic substrate has a phenyl ring substituted by two groups independently selected from bromo, iodo, tosylate, benzenesulfonate, mesylate, triflate, and chloro; and the aromatic diboronate has a phenyl ring substituted by two groups independently selected from boronic acid, boronic ester, and borane group. In some embodiments, the aromatic substrate has an aryl moiety substituted by two groups independently selected from bromo, iodo, and chloro; and the aromatic diboronate has an aryl moiety substituted by two groups independently selected from boronic acid and boronic ester. In some embodiments, the aromatic substrate has a phenyl ring substituted by two groups independently selected from bromo, iodo, and chloro; and the aromatic diboronate has a phenyl ring substituted by two groups independently selected from boronic acid and boronic ester. In some embodiments, the aromatic substrate has an aryl moiety substituted by two groups independently selected from bromo and iodo; and the aromatic diboronate has an aryl moiety substituted by two groups independently selected from boronic acid and boronic ester. In some embodiments, the aromatic substrate has a phenyl ring substituted by two groups independently selected from bromo and iodo; and the aromatic diboronate has a phenyl ring substituted by two groups independently selected from boronic acid and boronic ester.

As used herein, the term "polymer" refers to the product of the Suzuki polymerization of the aromatic substrate and the aromatic diboronate. The polymers may be conjugated polymers. The term conjugated refers to either a fully conjugated polymer i.e. a polymer which is conjugated along the full length of its chain, or a partially conjugated polymer i.e. a polymer which contains conjugated segments together with non-conjugated segments. The polymers are formed by coupling together two monomers: at least one "aromatic substrate" and at least one "aromatic diboronate".

As used herein, the term "aromatic substrate", as used in this context, refers to any aromatic moiety which can be used for a Suzuki polymerization, having an aryl or heteroaryl moiety, wherein the aromatic moiety has two groups selected from bromo, iodo, tosylate, benzenesulfonate, mesylate, triflate, and chloro, which is attached to the aryl or heteroaryl moiety, and which can be optionally substituted. Many aromatic substrates can be used (see e.g., Schlüter, A. D., J. Polym. Sci., Polym. Chem. Ed. 2001, 39, 1533; and Schlüter, A.-D.; Bo, Z., in Handbook of Organopalladium Chemistry for Organic Synthesis, Negishi, E., Ed.; John Wiley & Sons, Inc.: Hoboken, N.J., 2002; Vol. 1, p 825).

As used herein, the term "aromatic diboronate", as used in this context, refers to any aromatic moiety which can be used for a Suzuki polymerization, having an aryl or heteroaryl moiety, wherein the aromatic moiety has two groups selected from boronic acid, boronic ester, and borane, which is attached to the aryl or heteroaryl moiety, and which can be optionally substituted. Many aromatic diboronates can be used (see e.g., Schlüter, A. D., J. Polym. Sci., Polym. Chem. Ed. 2001, 39, 1533; and Schlüter, A.-D.; Bo, Z., in Handbook of Organopalladium Chemistry for Organic Synthesis, Negishi, E., Ed.; John Wiley & Sons, Inc.: Hoboken, N.J., 2002; Vol. 1, p 825).

As used herein, the term "aryl moiety", used in this context, refers to a monocyclic or polycyclic (e.g., having 2, 3 or 4 fused or covalently linked rings) aromatic hydrocarbon moiety, such as, but not limited to, phenyl, 1-naphthyl, 2-naphthyl, anthracenyl, phenanthrenyl, and the like, which may be optionally substituted. In some embodiments, aryl groups have from 6 to 20 carbon atoms, about 6 to 10 carbon atoms, or about 6 to 8 carbons atoms.

As used herein, the term "heteroaryl moiety", used in this context, refers to a monocyclic or polycyclic (e.g., having 2, 3 or 4 fused or covalently linked rings) aromatic hydrocarbon moiety, having one or more heteroatom ring members selected from nitrogen, sulfur and oxygen. When the heteroaryl group contains more than one heteroatom ring member, the heteroatoms may be the same or different. Example heteroaryl groups include, but are not limited to, pyrrolyl, azolyl, oxazolyl, thiazolyl, imidazolyl, furyl, thienyl, quinolinyl, isoquinolinyl, indolyl, benzothienyl, benzofuranyl, benzisoxazolyl, imidazo[1,2-b]thiazolyl or the like. In some embodiments, the heteroaryl group has 5 to 10 carbon atoms.

With respect to the boronic acid, boronic ester, and borane, the boronic acid group is represented by —B(OH)$_2$; the boronic ester group is preferably —B(OR$^x$)(OR$^y$) or —B(OR$^w$O) and the borane group is preferably —BR$^c$R$^d$, wherein R$^x$ is a substituted or non-substituted C$_1$-C$_6$ alkyl group and R$^y$ is H or a substituted or non-substituted C$_1$-C$_6$ alkyl group; R$^c$ and R$^d$ are each independently substituted or nonsubstituted C$_1$-C$_6$ alkyl groups, and R$^w$ is a substituted or non-substituted divalent hydrocarbon radical resulting in a 5 or 6 membered ester ring. Examples of suitable groups as R$^w$ include substituted or non-substituted C$_2$ or C$_3$ alkylene groups, or substituted or non-substituted ortho-or metaphenylene groups. Suitable boronic ester groups include, for example, the products of esterification of the corresponding boronic acid group with monovalent C$_1$-C$_6$ alcohols, ethane diols such as pinacol, propane diols or ortho aromatic diols such as 1,2-dihydroxybenzene.

Examples of suitable types of aromatic substrates and aromatic diboronates include, but are not limited to, fluorenes, quinoxalines, benzothiazoles, triarylamines, phenylenes, thiophenes, naphthylenes and stilbenes. Each aromatic group within the monomer may be substituted or unsubstituted. In some embodiments, the aromatic substrates and aromatic diboronates are those aromatic monomers moieties comprising fused carbocyclic rings, comprising heterocyclic rings or comprising triarylamines including fluorenes, benzothiadiazoles, triarylamines, thiophenes and quinoxalines. In some embodiments, the aromatic substrates and aromatic diboronates include fluorenes and arylamines such as 9,9-dioctylfluorene (F8), benzothiadiazole (BT), (1,4-phenylene-((4-secbutylphenyl)imino)-1,4-phenylene) (TFB), (2,7-(9,9-di-n-octylfluorene)-3,6-benzothiadiazole) (F8BT). In some embodiments, the aromatic substrates and aromatic diboronates include a pre-formed oligomeric or polymeric chain comprising several smaller units with the necessary functional groups provided at the desired positions on the chain. In some embodiments, the aromatic substrates and aromatic diboronates are those shown below, wherein X$^1$ and X$^2$ are reactive boron derivative groups or reactive halides.

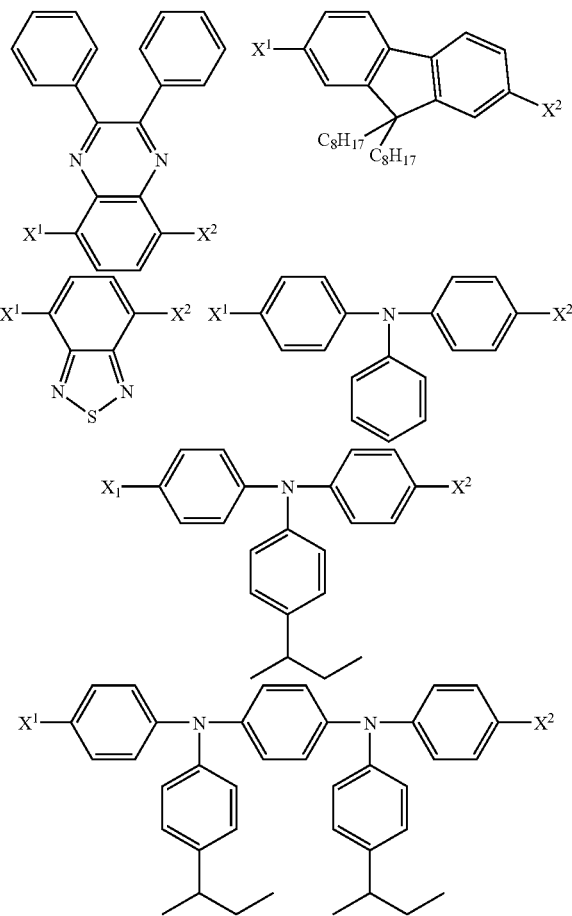

-continued

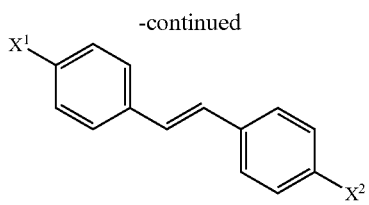

Other useful aromatic monomers include those in Neher, D., Macromol. Rapid Commun. 2001, 22, 1365; Leclerc, M., J. Polym. Sci., Polym. Chem. Ed. 2001, 39, 2867; and Chen, P.; Yang, G.; Liu, T.; Li, T.; Wang, M.; Huang, W., Polym. Int. 2006, 55, 473.

Monomers particularly useful in the present invention include those which may be polymerised to form a semiconductive polymer such as a semiconductive conjugated polymer for use in an optical device such as an electroluminescent device, suitable monomers include fluorenes, benzothiazoles, triarylamines, thiophenes and quinoxalines. Such polymers may be used in an emissive layer or as a hole transport or electron transport polymer. Luminescent polymers are particularly useful in such devices. The conjugated polymer may be fully or partially conjugated, perhaps containing conjugated segments and may be a homopolymer, a copolymer or an oligomer, and may be a linear or a branched chain polymer such as a dendrimer.

The monomers each have the appropriate functional groups for the Suzuki reaction. In one arrangement, a first reactive dihalide aromatic substrate is polymerised with a second aromatic diboronate having two boron derivative functional groups. In this arrangement the first and the second monomers may be the same or different. Where the monomers are the same, a homopolymer is produced. Where the monomers are different, a copolymer is produced.

In a second arrangement, a monomer having a boron derivative functional group and a reactive halide functional group is polymerised to form a homopolymer. It is also possible to form copolymers from this second arrangement simply by polymerising together two or more different types of monomer each containing both functionalities.

In some embodiments, the ligand is selected from trimethylphosphine, triethylphosphine, tripropylphosphine, triisopropylphosphine, tributylphosphine, tricyclohexylphosphine, tri(t-butyl)phosphine, 1,1'-bis(diphenylphosphino) ferrocene, 1,1'-bis(di-t-butylphosphino)ferrocene, 1'-(di-t-butylphosphino)-1,2,3,4,5-pentaphenylferrocene, tri(2-furyl)phosphine, 2-(di-t-butylphosphino)biphenyl, 2-(dicyclohexyl)biphenyl, butyldi-1-adamantylphosphine, 2,2'-bis(diphenylphosphino)-1,1'-binaphthyl, tri(p-tolyl) phosphine, trimethyl phosphite, triethyl phosphite, tripropyl phosphite, triisopropyl phosphite, tributyl phosphite, tris(2,4-di-t-butylphenyl)phosphite, tricyclohexyl phosphite, triphenylphosphine, tri(o-tolyl)phosphine, and triisopropylphosphine. In some embodiments, the ligand is tri(o-tolyl) phosphine.

Suitable organic solvents include, but are not limited to, dichloromethane, chloroform, toluene, benzene, THF, dimethoxyethane, dioxane, dimethylacetamide, dimethylsulfoxide, and dimethylformamide. Other other solvents for Suzuki polymerizations are known in the art.

In some embodiments, the the molar ratio of ligand to palladium metal is from 1:1 to 2:1.

For polymerizations, it is critical to match the stoichiometery of the aromatic substrate and the aromatic diboronate as closely as possible in order to maximize the molecular weight of the polymer, which is made via a step polymerization. The polymerization processes can be carried out using typical Suzuki reaction conditions, but using the palladium complexes of the invention as the palladium source (for a review, see Schlüter, A. D., J. Polym. Sci., Polym. Chem. Ed. 2001, 39, 1533; and Schlüter, A.-D.; Bo, Z., in Handbook of Organopalladium Chemistry for Organic Synthesis, Negishi, E., Ed.; John Wiley & Sons, Inc.: Hoboken, N.J., 2002; Vol, 1, p 825).

In some embodiments, the conditions sufficient to form a polymer comprise heating to a temperature of from about 30 to about 120° C. In some embodiments, the conditions sufficient to form a polymer comprise heating to a temperature of from about 30 to about 80° C. In some embodiments, the conditions sufficient to form a polymer comprise heating to a temperature of about 30 to about 120° C. for about 8 hours to 170 hours. In some embodiments, the conditions sufficient to form a polymer comprise heating to a temperature of about 30 to about 80° C. for about 8 hours to 48 hours.

In some embodiments, the base used in the reaction may be an inorganic base such as an alkaline earth carbonate or bicarbonate or an organic base, such as those organic bases disclosed in WO00/53656, including alkyl ammonium hydroxides, alkyl ammonium carbonates, alkyl ammonium biscarbonates, alkylammonium borates, 1,5-diazabicyclo [4.3.0]non-5-ene (DBN), 1,8-diazabicyclo[5.4.0]undec-7-ene (DBU), 1,4-diazabicyclo[2.2.2]octane (DABCO), dimethylaminopyridine (DMAP), pyridine, trialkylamines and alkylammonium fluorides such as tetraalkylammonium fluorides. In some embodiments, the base is a tetraalkyl ammonium hydroxide such as tetramethyl ammonium hydroxide, tetraethyl ammonium hydroxide or tetra-n-propyl ammonium hydroxide. In some embodiments, the base is selected from an alkali carbonate, an alkali bicarbonate, an alkaline earth carbonate, an alkaline earth bicarbonate, an organic base, an alkali phosphate, an alkali fluoride, an alkaline earth fluoride, and an alkaline earth phosphate.

Generally, in some embodiments, enough base is used so as to deprotonate the base labile groups on the palladium complex, such as the hydroxyl groups, or to facilitate the hydroxylsis of the protected groups on the complex such as the $C_{1-4}$ alkylcarbonyloxy groups. Additionally, in some embodiments, the base is usually added in a quantity sufficient to convert the boron derivative functional groups into —$B(OH)_3$ or —$BF_3$ anionic groups depending on the particular base selected.

Any of the aromatic substrates, aromatic diboronates, ligands, solvents, bases, conditions, and palladium complexes described herein can combined in any suitable combination to perform the polymerization processes of the invention.

Polymers prepared according to the present invention may be used in optoelectronic devices such as electroluminescent devices and photovoltaic devices. An electroluminescent device typically comprises, on a suitable substrate, an anode, a cathode and a layer of light-emitting material positioned between the anode and the cathode. Electroluminescent devices may further comprise charge transport layers and/or charge injecting layers positioned between the light-emitting material and the anode or cathode as appropriate. In electroluminescent devices of the present invention the high molecular weight polymers of the present invention may be present either as the light-emitting layer or as charge transporting or charge injecting layers or alternatively as charge transporting components in a blend with a light emitting material or as light emitting components in a blend with a charge transporting material. The thickness of the emitting layer can be in the range 10 nm-300 nm, preferably 50 nm-200 nm.

In some embodiments, the anode of the device preferably comprises a material of high work function deposited on a substrate. Preferably the material has a work function greater than 4.3 eV, examples of such materials include indium-tin oxide (ITO), tin oxide (TO), aluminum or indium doped zinc oxide, magnesium-indium oxide, cadmium tin-oxide and metals such as Au, Ag, Ni, Pd and Pt. Suitable substrates include glass and plastics, the substrate may be rigid or flexible, transparent or opaque. The material of high work function is suitably deposited on the substrate to form a film of 50 nm to 200 nm, preferably the film has a sheet resistance of 10-100 Ohm/square, more preferably less than 30 Ohm/square.

In some embodiments, the cathode of the device is preferably a material of low work function, preferably of work function less than 3.5 eV. Examples of such materials include Li, Na, K, Rb, Be, Mg, Ca, Sr, Ba, Yb, Sm and Al, the cathode may comprise an alloy of such metals or an alloy of such metals in combination with other metals, for example the alloys MgAg and LiAl. The cathode preferably comprises multiple layers, for example Ca/Al or LiAVAI, The device may further comprise a layer of dielectric material between the cathode and the emitting layer, such as is disclosed in WO 97/42666. In particular it is preferred to use an alkali or alkaline earth metal fluoride as a dielectric layer between the cathode and the emitting material. In some embodiments, the cathode comprises LiF/Ca/Al, with a layer of LiF of thickness from 1 to 10 nm, a layer of Ca of thickness 1 to 25 nm and a layer of Al of thickness 10 to 500 nm.

Where the electroluminescent device comprises further charge injecting or charge transporting materials, these further materials may be present as separate layers or in blend with the light emitting material. Examples of suitable charge transporting materials include polystyrene sulfonic acid doped polyethylene dioxythiophene (PEDOT-PSS), polyaniline with anionic dopants such as polymeric anionic dopants, and triarylamines, including polymeric triarylamines such as poly(2,7-(9,9-ni-n-octylfluorene)-(1,4-phenylene-(4-imino(benzoic acid))-1,4-phenylene-(4-imino(benzoic acid))-1,4-phenylene)) BFA. The charge transport or charge injecting layers suitably have a thickness in the range 10 nm to 200 nm, preferably 1 nm to 50 nm.

In some embodiments, the structure of an electroluminescent devices comprises a glass substrate, an ITO anode, a charge transporting layer of PEDOT-PSS, a layer of light-emitting material, a thin layer of LiF and a cathode comprising a layer of calcium and a layer of aluminum. In some embodiments, the polymers prepared according to the present invention could also be suitably used in photovoltaic devices such as those disclosed in WO96/16449.

The present invention further provides a mixture comprising an aromatic substrate having one group selected from bromo, iodo, tosylate, benzenesulfonate, mesylate, triflate, and chloro, an aromatic boronate having one group selected from boronic acid, boronic ester, and borane; a base, water, and a palladium complex of the invention or any of the embodiments described herein. Any of the aromatic substrates, aromatic boronates, ligands, solvents, bases, and palladium complexes described herein can combined in any suitable combination to form the mixtures of the invention. This mixture is prepared during the Suzuki coupling processes of the invention. In some embodiments, the mixture further comprises an organic solvent.

The present invention further provides a mixture comprising an aromatic substrate having two groups selected from bromo, iodo, tosylate, benzenesulfonate, mesylate, triflate, and chloro, an aromatic boronate having one group selected from boronic acid, boronic ester, and borane; a base, water, and a palladium complex of the invention or any of the embodiments described herein. Any of the aromatic substrates, aromatic diboronates, ligands, solvents, bases, and palladium complexes described herein can combined in any suitable combination to form the mixtures of the invention. This mixture is prepared during the Suzuki polymerization processes of the invention. In some embodiments, the mixture further comprises an organic solvent.

The present invention further provides a mixture comprising an aromatic substrate having one group selected from bromo, iodo, tosylate, benzenesulfonate, mesylate, triflate, and chloro, an aromatic boronate having one group selected from boronic acid, boronic ester, and borane, a base, water, and a ligand of Formula 1a, or salt thereof:

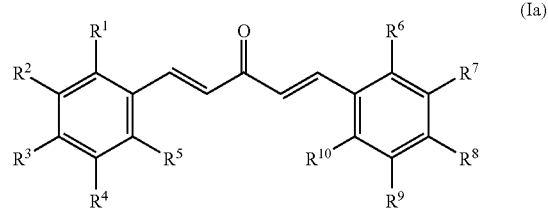

(Ia)

wherein:

$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S(O)$_2$—, HO—S(O)—, (HO)$_2$P(O)—, and $C_{1-4}$ alkylene, wherein the $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, and quaternary salt of $C_{2-8}$ dialkylamino;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups;

or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups;

each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S(O)$_2$—, HO—S(O)—, and (HO)$_2$P(O)—; and with the five provisos that:

(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$ alkyl)amino, HO—S(O)$_2$—, HO—S(O)—, (HO)$_2$P(O)—, and a quaternary salt of $C_{2-8}$ dialkylamino; wherein the $C_{1-4}$ alkylene is substituted by a moiety selected from carboxy, HO—S(O)$_2$—, HO—S(O)—, (HO)$_2$P(O)—, and a quaternary salt of $C_{2-8}$ dialkylamino;

(2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

The ligand is formed after hydrolysis of any hydrolyzable groups for $R^1$, $R^2$, $R^3$, $R^4$, $R^5$, $R^6$, $R^7$, $R^8$, $R^9$, and $R^{10}$, such as $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, or tri($C_{1-4}$ haloalkyl)silyloxy; or $C_{1-4}$ alkylene substituted by a moiety selected from $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl. This mixture forms during the Suzuki coupling processes of the invention. In some embodiments, the mixture further comprises an organic solvent.

The present invention further provides a mixture comprising an aromatic substrate having two groups selected from bromo, iodo, tosylate, benzenesulfonate, mesylate, triflate, and chloro, an aromatic diboronate having two groups selected from boronic acid, boronic ester, and borane, a base, water, and a ligand of Formula Ia:

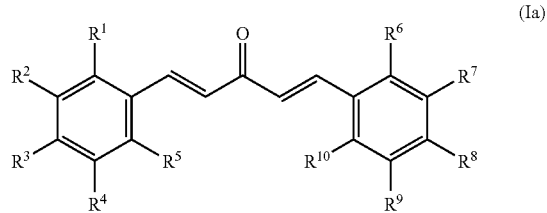

(Ia)

wherein:
$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S(O)$_2$—, HO—S(O)—, (HO)$_2$P(O)—, and $C_{1-4}$ alkylene, wherein the $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, and quaternary salt of $C_{2-8}$ dialkylamino;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups;

or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups;

each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S(O)$_2$—, HO—S(O)—, and (HO)$_2$P(O)—; and with the five provisos that:
(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$ alkyl)amino, HO—S(O)$_2$—, HO—S(O)—, (HO)$_2$P(O)—, and a quaternary salt of $C_{2-8}$ dialkylamino; wherein the $C_{1-4}$ alkylene is substituted by a moiety selected from carboxy, HO—S(O)$_2$—, HO—S(O)—, (HO)$_2$P(O)—, and a quaternary salt of $C_{2-8}$ dialkylamino;

(2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^3$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

The ligand is formed after hydrolysis of any hydrolysable groups for $R^1$, $R^2$, $R^3$, $R^4$, $R^5$, $R^6$, $R^7$, $R^8$, $R^9$, and $R^{10}$, such as $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ allyl)silyloxy, or tri($C_{1-4}$ haloalkyl)silyloxy; or $C_{1-4}$ alkylene substituted by a moiety selected from $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl. This mixture forms during the Suzuki polymerization processes of the invention. In some embodiments, the mixture further comprises an organic solvent.

Preparation of the Palladium Complexes

The ligands and complexes of the present invention can be prepared in a variety of ways known to one skilled in the art of organic synthesis. The compounds of the present invention can be synthesized using the methods as hereinafter described below, together with synthetic methods known in the art of synthetic organic chemistry or variations thereon as appreciated by those skilled in the art.

The ligands and complexes of present invention can be conveniently prepared in accordance with the procedures outlined in the schemes below, from commercially available starting materials, compounds known in the literature, or readily prepared intermediates, by employing standard synthetic methods and procedures known to those skilled in the art. Standard synthetic methods and procedures for the preparation of organic molecules and functional group transformations and manipulations can be readily obtained from the relevant scientific literature or from standard textbooks in the field. It will be appreciated that where typical or preferred process conditions (i.e., reaction temperatures, times, mole ratios of reactants, solvents, pressures, etc.) are given, other process conditions can also be used unless otherwise stated. Optimum reaction conditions may vary with the particular reactants or solvent used, but such conditions can be determined by one skilled in the art by routine optimization procedures. Those skilled in the art of organic synthesis will recognize that the nature and order of the synthetic steps presented may be varied for the purpose of optimizing the formation of the compounds of the invention.

In some embodiments, the processes described herein are monitored according to any suitable method known in the art. For example, product formation can be monitored by spectroscopic means, such as nuclear magnetic resonance spectroscopy (e.g., 1H or 13C NMR) infrared spectroscopy, spectrophotometry (e.g., IN-visible), or mass spectrometry, or by chromatography such as high performance liquid chromatography (HPLC) or thin layer chromatography.

Preparation of compounds can involve the protection and deprotection of various chemical groups. The need for protection and deprotection, and the selection of appropriate protecting groups can be readily determined by one skilled in the art. The chemistry of protecting groups can be found, for example, in Greene, et al., Protective Groups in Organic Synthesis, 4th. Ed., Wiley & Sons, 2007, which is incorporated herein by reference in its entirety.

The reactions of the processes described herein can be carried out in suitable solvents which can be readily selected by one of skill in the art of organic synthesis. Suitable solvents can be substantially nonreactive with the starting materials (reactants), the intermediates, or products at the temperatures at which the reactions are carried out, i.e., temperatures which can range from the solvent's freezing temperature to the solvent's boiling temperature. A given reaction can be carried out in one solvent or a mixture of more than one solvent. Depending on the particular reaction step, suitable solvents for a particular reaction step can be selected.

There are a number of synthetic procedures for making many dba ligands with different substitutents. Additionally, dba ligands can be prepared by the following general method by an aldol condensation of an aldehyde with acetone such as shown in Scheme A below. In some embodiments, the dba ligand is made by an acid catalyzed route. Asymmetric dba ligands of Formula Ia can be made by carefully controlling the stoichiometry, such as in the methods in Tenkovtsev, A. V.; Yakimansky, A. V.; Dudkina, M. M.; Lukoshkin, V. V.; Komber, H.; Häussler, L.; Böhme, F. *Macromolecules,* 2001, 34, 7100-7107. There are many known benzaldehydes which have been prepared in the literature, as well as a number of commercially available benzaldehydes with a variety of substitution patterns.

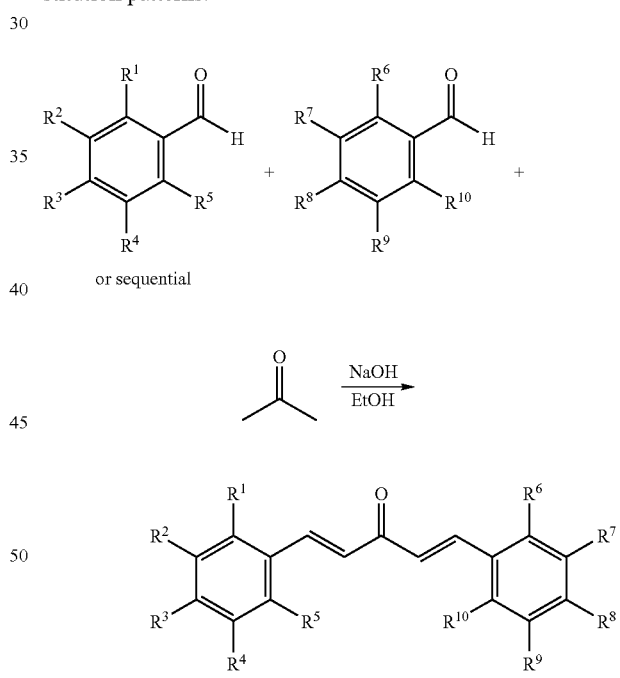

Modifications can be made to the functional groups in a variety of ways. For example, quaternary ammonium derivatives can be made by quaternizing the amino group of a dba synthesized from an aminobenzaldehyde derivative (e.g., see the scheme below). Commercially available aminobenzaldehyde derivatives that can be quaternized in this manner include 2-aminobenzaldehyde, 2-methyl-N-ethyl-N-(2-cyanoethyl)-4-aminobenzaldehyde, N-methyl-N-(2-hydroxyethyl)-4-aminobenzaldehyde, 4-[N,N-bis(2-hydroxyethyl) amino]benzaldehyde, 4-(dimethylamino)benzaldehyde, and 4-dimethylamino-2-methoxybenzaldehyde.

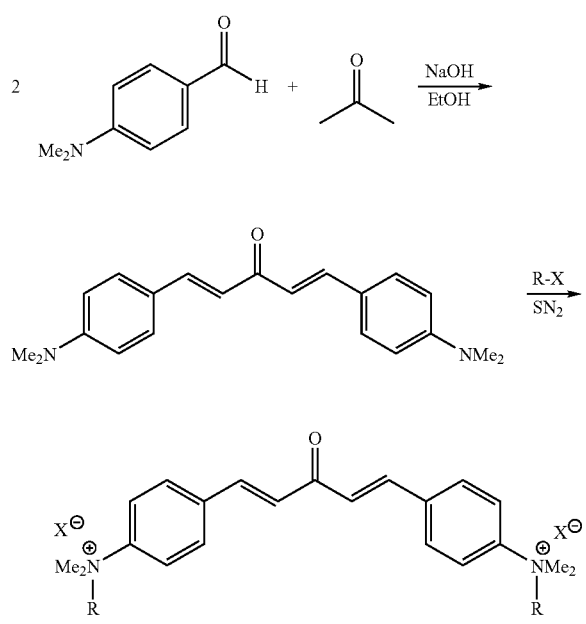

Placement of a sulfate group can be accomplished by oxidation of the a methylthio group, starting from a commercially available or synthesized alkyl-thio benzaldehyde derivative. For example, a sulfate compound can be synthesized from 4-(methylthio)benzaldehyde (e.g., see scheme below). Alternatively, the electron-poor alkenylketone should activate a chlorinated dba towards SNAr chemistry as shown in the second scheme below. The chlorinated dba derivatives are synthesized in the usual manner from chlorobenzaldehyde derivitves, many of which are commercially available, including 4-amino-2-chloro-benzaldehyde, 3-Chloro-2-fluoro-5-(trifluoromethyl)benzaldehyde, 3-Chloro-2-fluoro-6-(trifluoromethyl)benzaldehyde, 2-Chloro-3-(trifluoromethyl)benzaldehyde, 2-Chloro-5-(trifluoromethyl)benzaldehyde, 4-Chloro-3-(trifluoromethyl)benzaldehyde, 2-(4-chloro-3-methyl-phenoyxmethyl)-4-methoxybenzaldehyde, 3-chloro-hydroxy-5-methoxybenzaldehyde, 3-(4-Chlorophenyl)benzaldehyde, 2-Chlorobenzaldehyde, 3-Chlorobenzaldehyde, 4-Chlorobenzaldehyde, 2-Chloro-6-methylbenzaldehyde, 2-Chloro-4-hydroxybenzaldehyde, 2-Chloro-3-hydroxybenzaldehyde, 2-Chloro-6-fluorobenzaldehyde, 2-Chloro-4-fluorobenzaldehyde, 2-Chloro-3-methoxybenzaldehyde, 6-Chloro-2-fluoro-3-methylbenzaldehyde, 2-Chloro-6-fluoro-3-methylbenzaldehyde, 2-Chloro-3,6-difluorobenzaldehyde, 6-chloropiperonal, 2-Chloro-6-nitrobenzaldehyde, 2-Chloro-5-nitrobenzaldehyde, 2-Chloro-3-hydroxy-4-methoxybenzaldehyde, 2-Chloro-3,4-dimethoxybenzaldehyde, 3-Chloro-4-methylbenzaldehyde, 3-Chloro-2-hydroxybenzaldehyde, 3-Chloro-4-hydroxybenzaldehyde, 5-Chlorosalicylaldehyde, 3-Chloro-2-fluorobenzaldehyde, 3-chloro-5-fluorobenzaldehyde, 3-Chloro-4-fluorobenzaldehyde, 3-Chloro-4-methoxybenzaldehyde, 3-Chloro-5-fluorosalicylaldehyde, 3-Chloro-5-fluoro-4-hydroxybenzaldehyde, 3-Chloro-2,6-difluorobenzaldehyde, 5-Chloro-2-nitrobenzaldehyde, 4-Chloro-3-Fluorobenzaldehyde, 2,4-dichlorobenzaldehyde, 3,4-dichlorobenzaldehyde, 4-chloro-3-nitrobenzaldehyde, and 4-chloro-2-nitrobenzaldehyde.

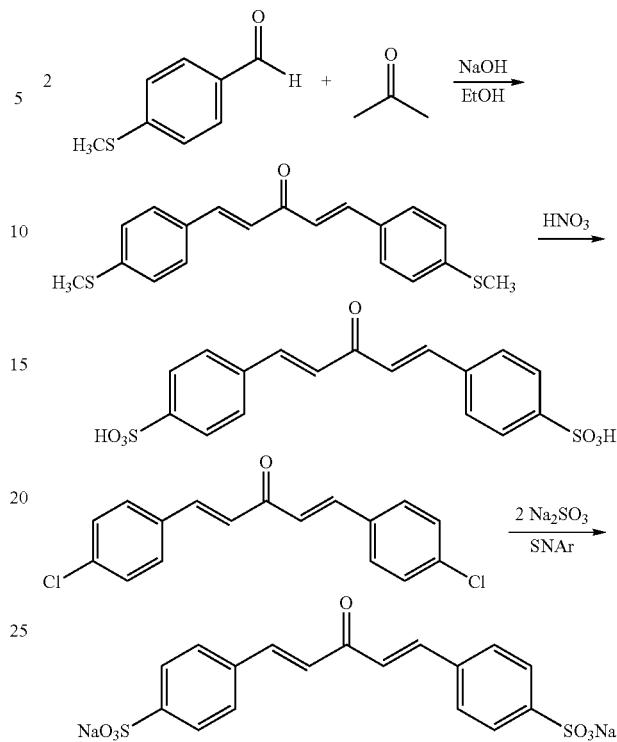

Sulfinate salts could be achieved by oxidizing the mercaptans, which in turn can be isolated via $S_NAr$ chemistry. The chlorinated dba derivatives are synthesized in the usual manner from chlorobenzaldehyde derivitves, many of which are commercially available (see above).

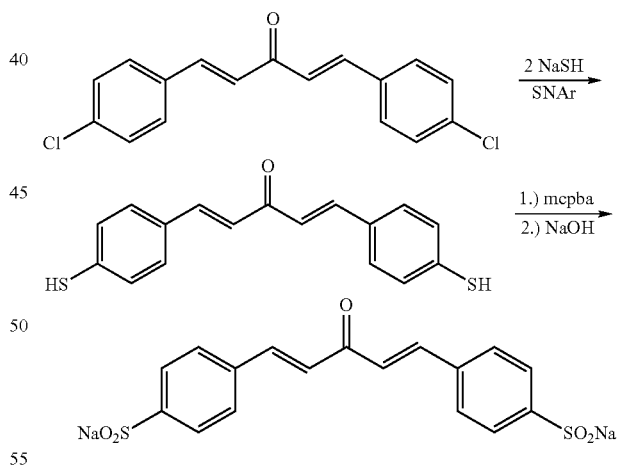

Phosphates can be synthesized from organolithiums, which in turn come from the bromide derivatives (see scheme below). The brominated dba derivatives are synthesized in the usual manner from brominated benzaldehyde compounds, many of which are commercially available including: 4-Bromobenzaldehyde, 4-Bromo-2-fluorobenzaldehyde, 4-Bromo-2-methoxybenzaldehyde, 4-Bromo-3-nitrobenzaldehyde, 3,4-dibromobenzaldehyde, 3-Bromobenzaldehyde, 5-Bromo-2-fluorobenzaldehyde, 3-Bromo-4-fluorobenzaldehyde, 5-Bromosalicylaldehyde, 3-Bromo-2-hydroxybenzaldehyde, 3-Bromo-4-hydroxybenzaldehyde, 5-Bromo-2- methoxybenzaldehyde, 3-Bromo-4-methoxybenzaldehyde, 5-Bromo-3-fluorosalicylaldehyde, 5-Bromo-2-ethoxybenzaldehyde, 5-Bromovanillin, 3-bromo-2-hydroxy-5-methoxybenzaldehyde, 5-Bromo-2-hydroxy-3-methoxybenzaldehyde, 3-Bromo-5-chlorosalicylaldehyde, 5-Bromoveratraldehyde, 5-Bromo-2,3-dimethoxybenzaldehyde, 3-bromo-5-ethoxy-4-hydroxybenzaldehyde, 5-Bromo-3-nitrosalicylaldehyde, 3-Bromo-5-nitrosalicylaldehyde, 6-Bromo-3-formylchromone, 3,5-Dibromobenzaldehyde, 2,5-Dibromobenzaldehyde, 2-Bromobenzaldehyde, 2-Bromo-4-methylbenzaldehyde, 2-Bromo-5-fluorobenzaldehyde, 2-Bromo-3-hydroxy-4-methoxybenzaldehyde, 2-Bromo-5-hydroxy-4-methoxybenzaldehyde, 6-Bromo-2-hydroxy-3-methoxybenzaldehyde, 2-bromo-4-hydroxy-5-methoxybenzaldehyde, 6-Bromoveratraldehyde, and 6-bromo-2,3-dimethoxybenzaldehyde. Other derivatives can by synthesized by simple electrophilic bromination of the benzaldehyde.

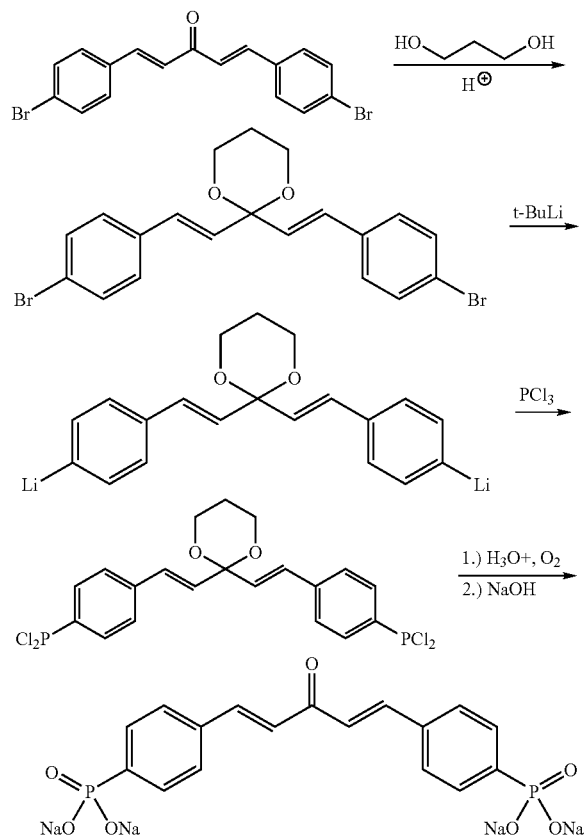

The compounds of Formula Ia having an $C_{1-4}$ alkylene spacer could be synthesized by treating the methyl derivative with NBS, and then substituting with cyanide (subsequent hydrolysis yields the acid, sulfite, or a phosphite.

Carboxyl containing dbas can be synthesized through aldol condensation starting from formylbenzoic acid derivatives such as 4-formylbenzoic acid which is commercially available, Aldol condensation in the usual manner should form the carboxyl-substituted dba. Alternatively, a carboxyl group can be introduced via the organolithium. The organolithium is synthesized from the bromide derivative, which comes from a bromobenzaldehyde compound, many of which are commercially available, as summarized above.

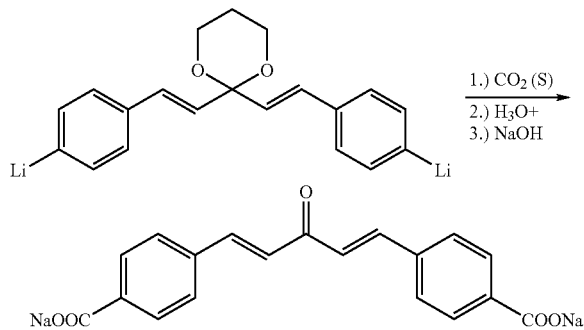

Commercially available hydroxybenaldehydes include, but are not limited to, salicylaldehyde, 2-hydroxy-4-methylbenzaldehyde, 2-hydroxy-5-methylbenzaldehyde, 2-hydroxy-3-methylbenzaldehyde, 2,5-dihydroxybenzaldehyde, 2,4-dihydroxybenzaldehyde, 2,3-dihydroxybenzaldehyde, 3-fluoro-2-hydroxybenzaldehyde, 5-fluoro-2-hydroxybenzaldehyde, 4-hydroxy-2-methoxybenzaldehyde, 2,4-dihydroxy-6-methylbenzaldehyde, 2-hydroxy-4-methoxybenzaldehyde, 2-hydroxy-5-methoxybenzaldehyde, 2-hydroxy-3-methoxybenzaldehyde, 2,4,6-trihydroxybenzaldehyde, 2,3,4-trihydroxybenzaldehyde, 2,3,4-trihydroxybenzaldehyde, 5-fluoro-2-hydroxy-3-methylbenzaldehyde, 3-chloro-2-hydroxybenzaldehyde, 5-chloro-2-hydroxybenzaldehyde, 3,5-difluoro-2-hydroxybenzaldehyde, 3-formyl-4-hydroxybenzoic acid, 4-formyl-3-hydroxybenzoic acid, 5-formyl-2-hydroxybenzoic acid, 3-hydroxybenzaldehyde, 3,4-dihydroxybenzaldehyde, 3,5-dihydroxybenzaldehyde, 4-hydroxy-3-methoxybenzaldehyde, 3-hydroxy-4-methoxybenzaldehyde, 2-chloro-3-hydroxybenzaldehyde, 3-ethoxy-4-hydroxybenzaldehyde, 3-hydroxy-4-nitrobenzaldehyde, 5-hydroxy-2-nitrobenzaldehyde, 3,4-dihydroxy-5-methoxybenzaldehyde, 3-fluoro-4-hydroxy-5-methoxybenzaldehyde, 3,4,5-trihydroxybenzaldehyde hydrate, 4-hydroxybenzaldehyde, 4-hydroxy-3-methylbenzaldehyde, 4-hydroxy-3,5-dimethylbenzaldehyde, 3-chloro-4-hydroxybenzaldehyde, 2-chloro-4-hydroxybenzaldehyde, 5-formyl-2-hydroxybenzoic acid, 3-formyl-4-hydroxybenzoic acid, 4-hydroxy-3-nitrobenzaldehyde, methyl 2,4-dihydroxy-3-formylbenzoate. Commercially available hydroxynaphtaldehydes include, but are not limited to, 2-hydroxy-1-naphthaldehyde and 4-hydroxy-1-naphthaldehyde.

Commercially available carboxybenzaldehydes (or esters thereof) include, but are not limited to, 4-formyl-3-hydroxybenzoic acid, methyl 4-formyl-3-nitrobenzoate, 3-formylbenzoic acid, methyl 3-formylbenzoate, 3-formyl-4-hydroxybenzoic acid, 5-formyl-2-hydroxybenzoic acid, methyl 2,4-dihydroxy-3-formylbenzoate, methyl 3-formyl-4-nitrobenzoate, 5-formyl-2,4-dimethoxybenzoic acid, and 2-formyl-5-methoxy-isophthalic acid dimethyl ester.

Commercially available sulfonated benzaldehydes include, but are not limited to, sodium 2-formylbenzenesulfonate, 4-formyl-benzene-1,3-disulfonic acid, and 4-formyl-1,3-benzenedisulfonate hydrate.

The palladium complexes of the invention are made by methods for preparing a palladium dba complex. For example, the palladium complexes may be prepared by reacting the dba ligand of Formula Ia with palladium(II), generally palladium chloride in the presence of oxygen, sodium acetate, in a methanol solvent at temperatures around 50° C., as shown in the scheme below.

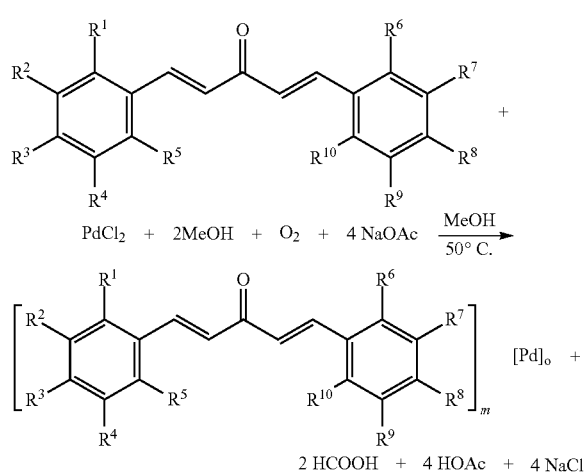

The palladium complexes of the invention wherein $L^1$ is a phosphine ligand can be prepared by the methods shown in the schemes below and as described in Paul, F.; Patt, J.; Hartwig, J. F. *Organometollics*, 1995, 14, 3030-3039. Depending upon the phosphine, $L^1Pd(dba)_2$ or $L^1Pd(dba)$ can be formed preferentially (wherein dba is the ligand of Formula Ia).

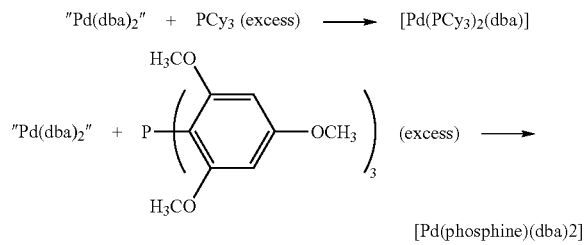

The palladium complexes of the invention wherein $L^1$ is a phosphine equivalent such as a N-heterocyclic carbene ("NHC") ligand (e. g. that generated in situ from 1,3-bis(2,4, 6-trimethylphenyl)imidazolium chloride or other salt thereof, or generated in situ form 1,3-bis(2,6-diisopropylphenyl)imidazolium chloride or other salt thereof), could be forming the phosphine equivalent in situ, e.g., from the imdazolium chloride salt, by treating it with a base like alkoxide. The complex could be prepared by a method analogous to Hartwig's procedure for preparing the analogous phosphine complexes. The reaction should be performed in THF to keep the complex soluble, in the presence of a base that is insoluble in THF to prevent deprotonation of the hydroxy-dba ligand. The imidazolium chloride is suspended in THF along with an excess of NaH. After stirring for 15 minutes, the suspension is filtered to remove excess base. This filtered solution is then added to a THE solution of the palladium complex (NHC:Pd molar ratio of 2:1), and the reaction is allowed to stir for 24 hours. After filtration, crystallization can be induced by layering two volumes of diethyl ether onto the solution. An NHC-Pd-(dba) complex has been postulated as an intermediate in a Suzuki coupling of aryl chlorides: Fairlamb, I. J. S.; Kapdi, A. R.; Lee, A. F.; McGlacken, G. P.; Weissburger, F.; deVries, A. H. M.; Schmieder-van de Vondervoort, L. *Chem. Eur. J.* 2006, 12, 8750-8761.

EXAMPLES

In order that the invention disclosed herein may be more efficiently understood, examples are provided below. It should be understood that these examples are for illustrative purposes only and are not to be construed as limiting the invention in any manner.

Example 1

Screening of palladium Catalysts

The catalyst systems for Suzuki coupling reactions generally consist of a palladium source and a phosphine cocatalyst. These react rapidly in situ to form palladium-phosphine complexes, which are believed to be the actual catalysts in the catalytic cycle (Scheme 1). Most of the work in catalyst development has been geared towards the synthesis and screening of new phosphine cocatalysts. By tuning the sterics and electronics of these ligands, researchers have been able to amp up the activities of the resulting catalysts in small molecule coupling reactions.

Unfortunately, when used in polymerization, the new cocatalysts do not provide molecular weight improvements when compared to the values obtained with a traditional system. One surprising result, however, was that the molecular weights were strongly dependent upon the source of palladium used in the polymerizations. Murage, J.; Eddy, J. W.; Zimbalist, J. R.; McIntyre, T. B.; Wagner, Z. R.; Goodson, F. E., *Macromolecules*, 2008, 41, 7330-7338. This not only calls into doubt the above assumptions on the identity of the catalytically active species, but it also suggests that in tuning the properties of the phosphine cocatalyst, researchers have been attempting to optimize the wrong component of the catalyst system.

Scheme 1. Entrance of Palladium into the Catalytic Cycle of a Suzuki Coupling Reaction.

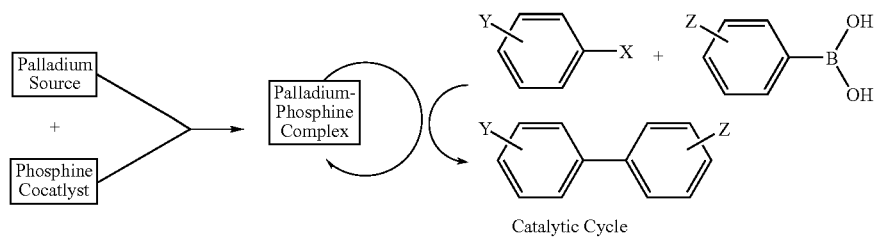

Catalytic Cycle

One of the most common sources of palladium in Suzuki coupling reactions is tris(dibenzylideneacetone)dipalladium (0), or $Pd_2dba_3$. This compound has the advantageous properties of being soluble and air-stable, and it is known to react rapidly with phosphines and aryl halides for expedient entry into the catalytic cycle (eq. 3). However, from extensive electrochemical studies on palladium phosphine complexes, the dibenzylideneacetone (dba) byproducts released from this catalyst induction step are actually stronger ligands than phosphines. Amatore, C.; Jutand, A., in *Handbook of Organopalladium Chemistry for Organic Synthesis*, Negishi, E., Ed.; John Wiley & Sons, Inc.: Hoboken, N.J., 2002; Vol. 1, p. 943-972. This may suggest that the dba ligands should be intimately involved in the catalytic cycle, rather than serve as benign spectators—a supposition that would explain the fact that we have found that molecular weights were strongly dependent upon the source of palladium used in the polymerizations.

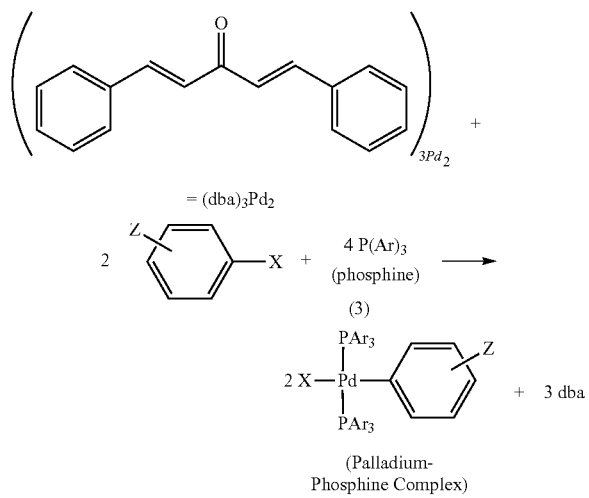

In an attempt to optimize the molecular weights of polymers synthesized using Suzuki coupling, a number of palladium catalysts were synthesized and screened in polymerization reactions. Simultaneous polymerizations (eq. 2, n=6, m=1) were set up with precursors A, B, C, D, and E (Table 1). As can be seen from the data in Table 2, the electron-rich complex A preformed worse than the electron-neutral complex C, which performed worse than the electron-poor complex B. While our results did confirm that the molecular weights could be varied with the choice of the dba ligand on the catalyst precursor, none of the new systems matched the molecular weights obtained with E.

TABLE 1

Palladium Catalysts Screened for Polymerization

| Catalyst | $R^1$ | $R^2$ |
|---|---|---|
| A | 4-OCH$_3$ | 4-OCH$_3$ |
| B | 4-CF$_3$ | 4-CF$_3$ |
| C | H | H |

TABLE 1-continued

Palladium Catalysts Screened for Polymerization

| | | |
|---|---|---|
| D | Tetrakis(triphenylphosphine)palladium (0) | |
| E | Bis[tri(o-tolyl)phosphine]palladium(0) | |

TABLE 2

Polymerization Results

| Entry | n (eq 2) | Catalyst | % Pd/Br | Solvent | $M_n$ (g/mol) | $M_w$ (g/mol) |
|---|---|---|---|---|---|---|
| 1 | 6 | A + P(o-Tol)$_3$ | 1.0 | CH$_2$Cl$_2$ | 16,900 | 30,500 |
| 2 | 6 | B + P(o-Tol)$_3$ | 1.0 | CH$_2$Cl$_2$ | 80,300 | 112,000 |
| 3 | 6 | B + P(o-Tol)$_3$ | 1.0 | CH$_2$Cl$_2$ | 78,700 | 118,000 |
| 4 | 6 | C + P(o-Tol)$_3$ | 1.0 | CH$_2$Cl$_2$ | 51,200 | 86,000 |
| 5 | 6 | E | 0.5 | CH$_2$Cl$_2$ | 214,000 | 345,000 |
| 6 | 6 | E | 0.5 | CH$_2$Cl$_2$ | 267,000 | 382,000 |
| 7 | 6 | E | 0.5 | CH$_2$Cl$_2$ | 176,000 | 262,000 |
| 8 | 6 | F(p) + P(o-Tol)$_3$ | 1.0 | CH$_2$Cl$_2$ | 215,000 | 298,000 |
| 9 | 6 | F(p) + P(o-Tol)$_3$ | 1.0 | CH$_2$Cl$_2$ | 96,000 | 150,000 |
| 10 | 6 | G + P(o-Tol)$_3$ | 1.0 | CH$_2$Cl$_2$ | 93,700 | 181,000 |
| 11 | 6 | G + P(o-Tol)$_3$ | 1.0 | CH$_2$Cl$_2$ | 88,400 | 135,000 |
| 12 | 6 | C + 2P(o-Tol)$_3$ | 1.0 | THF | 50,400 | 81,100 |
| 13 | 6 | C + 2P(o-Tol)$_3$ | 1.0 | THF | 48,100 | 76,400 |
| 14 | 6 | D | 1.0 | THF | 15,600 | 22,600 |
| 15 | 6 | E | 1.0 | THF | 129,000 | 197,000 |
| 16 | 6 | E | 1.0 | THF | 129,000 | 193,000 |
| 17 | 6 | F(c) + 2P(o-Tol)$_3$ | 1.0 | THF | 102,000 | 165,000 |
| 18 | 6 | F(c) + 2P(o-Tol)$_3$ | 1.0 | THF | 69,400 | 104,000 |
| 19 | 6 | F(c) + 2P(o-Tol)$_3$ | 1.0 | CH$_2$Cl$_2$ | 37,800 | 59,700 |
| 20 | 6 | F(c) + 2P(o-Tol)$_3$ | 1.0 | CH$_2$Cl$_2$ | 26,100 | 59,900 |
| 21 | 5 | E | 1.0 | CH$_2$Cl$_2$ | 208,000 | 504,000 |
| 22 | 5 | E | 1.0 | CH$_2$Cl$_2$ | 198,000 | 479,000 |
| 23 | 5 | C + 2P(o-Tol)$_3$ | 1.0 | CH$_2$Cl$_2$ | 64,000 | 125,000 |
| 24 | 5 | C + 2P(o-Tol)$_3$ | 1.0 | CH$_2$Cl$_2$ | 64,500 | 123,000 |
| 25 | 5 | F(f) + 2P(o-Tol)$_3$ | 1.0 | CH$_2$Cl$_2$ | 164,000 | 369,000 |
| 26 | 5 | F(f) + 2P(o-Tol)$_3$ | 1.0 | CH$_2$Cl$_2$ | 138,000 | 300,000 |
| 27 | 5 | F(t) + 2P(o-Tol)$_3$ | 1.0 | CH$_2$Cl$_2$ | 131,000 | 383,000 |
| 28 | 5 | G + P(o-Tol)$_3$ | 1.0 | CH$_2$Cl$_2$ | 113,000 | 225,000 |
| 29 | 5 | G + P(o-Tol)$_3$ | 1.0 | CH$_2$Cl$_2$ | 106,000 | 305,000 |

All polymerizations with a given monomer system were performed from the same monomer stock solution, ensuring identical stoichiometric match. Precursor F provided different results based upon whether it was isolated as a crude powder (p), purified crystalline material (c), freeze-dried from dioxane after recrystallization (f), or pre-reacted in THF (t) prior to removal of this solvent with subsequent addition of base and the polymerization solvent (CH$_2$Cl$_2$).

The catalytic cycle of a Suzuki Coupling reaction is depicted in Scheme 2. In their work on small molecule examples, Fairlamb and coworkers investigated the effect of dba substituent on the activities and yields of Suzuki Couplings of aryl chlorides, for which oxidative addition is known to be the rate determining step (Fairlamb, I. J. S.; Kapdi, A. R.; Lee, A. F., *Org. Lett.* 2004, 6, 4435-4438). While for aryl iodide substrates, it is transmetallation that is rate determining (Smith, G. B.; Dezeny, G. C.; Hughes, D. L.; King, A. O.; Verhoeven, T. R., J. Org. Chem. 1994, 59, 8151-8156), the case for aryl bromides is less clear (Goodson, F. E.; Wallow, T. I.; Novak, B. M., J. Am. Chem. Soc. 1997, 119, 12441-12453).

Scheme 2. General catalytic cycle for a Suzuki Coupling Reaction.

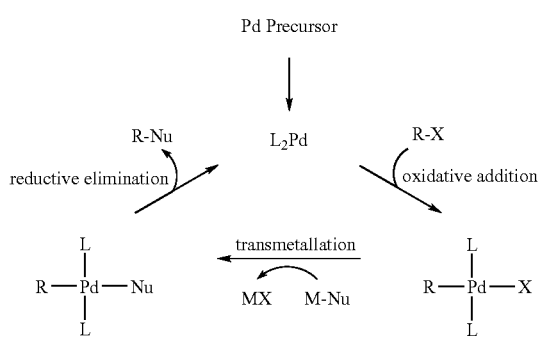

Unfortunately, the use of E as a catalyst is highly inconvenient. For example, its purification may require a weeks-long recrystallization for full recovery (Paul, F.; Patt, J.; Hartwig, J. F., *Organometallics* 1995, 14, 3030-3039). Further, since it is sensitive to heat, light, and oxygen, it has to be stored in a drybox freezer and manipulated in an oxygen-free atmosphere. Ideally, a catalyst system will combine the convenience and stability of $Pd_2dba_3$ with the activity of E. A dba ligand that would deliver the palladium into the catalytic cycle (thus forming E in situ) without interfering with the subsequent catalysis would provide such a system.

Towards this end, palladium complex F was synthesized (eq. 5) from the readily obtained ligand. The dibenzylideneacetone ligand is synthesized by reacting acetone and 4-hydroxybenzaldehyde under acid-catalyzed conditions (eq. 4, HCl used as the acid, in methanol). This synthesis and subsequent purification were performed in air, verifying the air stability of this complex. Unambiguous characterization of F was achieved by isolating structure-quality crystals, which were then analyzed via X-ray crystallography (FIG. 1).

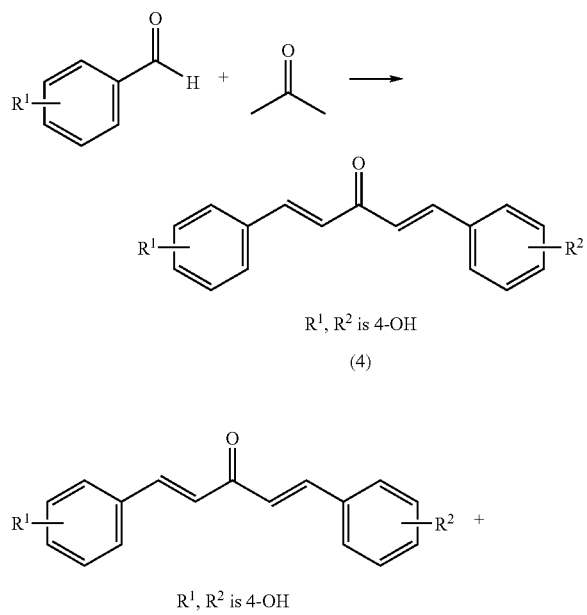

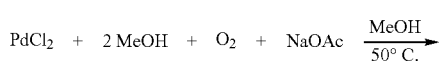

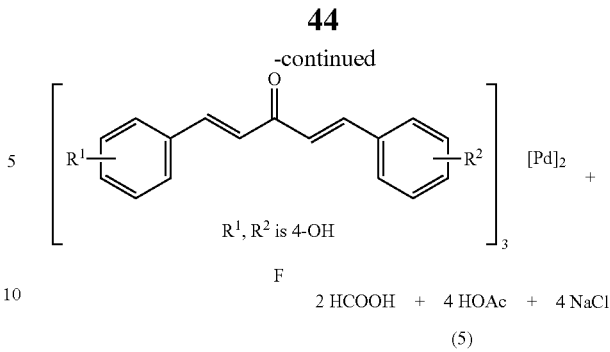

$$2\,HCOOH\ +\ 4\,HOAc\ +\ 4\,NaCl$$

(5)

Without wishing to be bound by a particular theory, is is believed that, for F, that the basic conditions of the catalysis cause the phenolic proton of the ligand to be deprotonated, thus turning the moderately electron-donating hydroxy group into a strongly donating oxide (Scheme 3). Evidence for the deprotonation (and subsequent aqueous partitioning) of 1 during the polymerization was provided by the fact that the aqueous phase turned orange as the reaction progressed. Since we think that strongly electron-donating groups on the dba ligands do not provide for stable complexes, we believed this pH switch may turn a strong Pd(0) ligand into a weak one. Furthermore, the negative charge on the phenoxide groups may cause the dba ligands to partition into the aqueous phase, allowing the catalysis to occur unhindered in the organic phase. As can be seen from the data in Table 1, we obtained molecular weights with F comparable (at the high end) to those of E, and far surpassing (even at the low end) those obtained with the other $Pd_2dba_3$ complexes.

Scheme 3. Generation of catalytically active E in situ from precursor F.

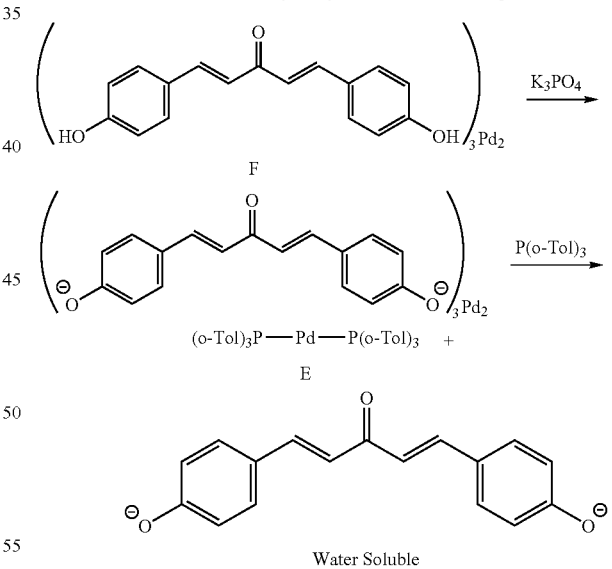

One disadvantage of F is that it is not soluble in the $CH_2Cl_2$ solvent system that was found to be optimal for these polymerizations. To work around this difficulty, an acetyl complex G was synthetized from the corresponding dba 2 (equation 6, obtained by acetylating 1 in acetic anhydride). The acetyl group provided a greater amount of solubility, while the base lability allowed for G to be transformed into F under the basic conditions of the polymerization. As can be seen from the data in Table 2, G did perform better than A, B, and C. However, the molecular weights were not as high as those obtained with the best ran from F (although these polymerizations also turned orange). Use of a more base-labile protecting group, such as chloroacetate, dichloroacetate, trichloroacetate, or trifluoroacetate should allow for more efficient removal of the protecting group at the beginning of the polymerization.

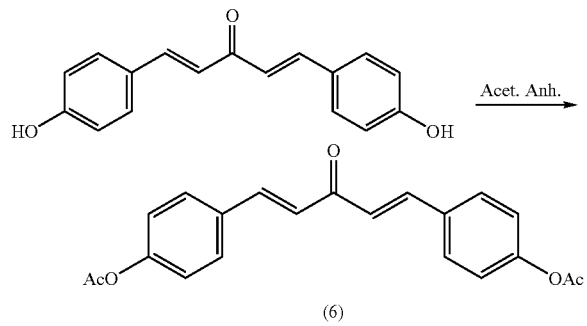

(6)

Complex D, the catalyst system most commonly used in Suzuki polycondensations, was not initially screened, since triphenylphosphine-based catalysts are known to be incompatible with halogenated solvents (Goodson, F. E.; Wallow, T. I.; Novak, B. M., *J. Am. Chem. Soc.* 1997, 119, 12441-12453; Grushin, V. V., *Organometallics* 2000, 19, 1888-1900.). Thus, in order to compare our systems more fairly with the traditional examples, polymerizations with C, D, E, and F were also performed in THF (Table 1). While D did result in molecular weights that were consistent with its use in the literature (e. g. Zhou, X.-H.; Zhang, Y.; Xie, Y.-Q.; Cao, Y.; Pei, J., *Macromolecules* 2006, 39, 3830-3840), the results were still inferior to those of the tri(o-tolyl)phosphine-based systems (in agreement with literature observations: Goodson, F. E.; Wallow, T. I,; Novak, B. M., *Macromolecules* 1998, 31, 2047-2056). Interestingly, the performance of F was not as impressive in this solvent, yielding results that, while still superior to C, were noticeably inferior to those of E. This indicates to us that a hydrophobic cosolvent, such as $CH_2Cl_2$, is preferred for better partitioning of 1 into the aqueous phase, thus preventing it from interfering with the catalysis.

Example 2

General Synthetic Preparations and Procedures

Dibenzylideneacetone ligand 1 (Tenkovtsev, A. V.; Yakimansky, A. V.; Dudkina, M. M.; Lukoshkin, V. V.; Komber, H.; Häussler, L.; Böhme, F., *Macromolecules* 2001, 34, 7100-7107) was synthesized according to literature procedures with substitution of methanol as solvent instead of ethanol, as were complexes A (Fairlamb, I. J. S.; Kapdi, A. R.; Lee, A. F., *Org. Lett.* 2004, 6, 4435-4438), B (Fairlamb, I. J. S.; Kapdi, A. R.; Lee, A. F., *Org. Lett.* 2004, 6, 4435-4438) and E (Paul, F.; Patt, J.; Hartwig, J. F., *Organometallics* 1995, 14, 3030-3039).

Hexaethylene glycol di(p-toluenesulfonate), and the boronic ester monomer, 1,4-bis(1,3,2-dioxaborolan-2-yl) benzene, were synthesized according to the procedures of Ouchi, M.; Inoue, Y.; Liu, Y.; Nagamune, S.; Nakamura, S.; Wada, K.; Hakushi, T., *Bull. Chem. Soc. Jpn.* 1990, 63, 1260; and Wagner, Z. R.; Roenigk, T. K.; Goodson, F. E., *Macromolecules* 2001, 34, 5740-5743, respectively.

Palladium complexes C and D as well as tri(o-tolyl)phosphine (obtained air-free from commercial suppliers) were stored and weighed out in an argon-filled drybox. Polymerization solvents were obtained air-free and anhydrous from Aldrich, and were similarly stored and dispensed in the drybox. All other chemicals, including penta(ethylene glycol)di (p-toluenesulfonate), were used as received from commercial suppliers. The water content for commercial $K_3PO_4 \cdot xH_2O$ varies from sample to sample, and that for the particular sample used was determined to be 19% from TGA and titration experiments. Molecular weights were measured in chloroform solution with a tandem GPC-LS apparatus that consisted of an Agilent Technologies Series 1100 or Perkin-Elmer Series 200 EPLC pump equipped with Waters Styrogel GPC columns (HR5E, HR4, HR4E connected in series) in line with a Wyatt Technologies DAWN-EOS light scattering photometer and a Wyatt Optilab DSP interferometic refractometer. Measurements were made at 25.0° C. and a wavelength of 690 nm.

Example 3

Hexaethylene glycol di(3-bromophenyl)ether

A synthesis of was published in Hargadon, M. T.; Davey, E. A.; McIntyre, T. B.; Gnanamgari, D.; Wynne, C. M.; Swift, R. C.; Zimbalist, J. R.; Fredericks, B. L.; Nicastro, A. J.; Goodson, F. E. *Macromolecules* 2008, 41, 741-750. A 250 mL round-bottomed flask was charged with 5.41 g (9.14 mmol) of hexaethylene glycol di(p-toluenesulfonate), 4.67 g (27.0 mmol) of 3-bromophenol, 12.8 g of $K_2CO_3$ (92.6 mmol), and 50 mL of DMF. The reaction was then left to stir overnight in a 60° C. oil bath, after which the solvent was removed via vacuum distillation. Dichloromethane was then added to the residue, and the resulting suspension was filtered to remove excess carbonate and salt byproducts. Afterwards, the solvent was removed with a rotary evaporator, and the residue was heated in a kugelrohr oven under a dynamic 5 mtorr vacuum to remove excess 3-bromophenol. The crude product was then chromatographed on silica with an eluent of hexanes/EtOAc adjusted to give an $R_f$ for the product of 0.2-0.3. Hexaethylene glycol di(3-bromophenyl)ether (3.70 g, 6.26 mmol, 69% yield), was then isolated as a pale yellow oil after distillation at 200° C. (<1 mtorr): $^1H$ NMR (300 MHz, $CDCl_3$) δ 7.05-7.15 (multiple resonances, 6H); 6.84 (dm, $J_d$=8.1 Hz, 2H); 4.09 (t, J=4.5 Hz, 4H); 3.83 (t, J=4.8 Hz, 4H); 3.64-3.74 (multiple resonances, 8H); 3.65 (s, 8H); $^{13}C$ NMR (75 MHz, $CDCl_3$) δ 159.7, 130.4, 124.0, 122.7, 118.3, 113.8, 70.9, 70.7, 70.6, 69.6, 67.9, (one signal not resolved). Anal. Calcd. for $C_{24}H_{32}Br_2O_7$: C, 48.67; H, 5.44; Found: C, 48.83; H, 5.59.

Example 3a

Pentaethylene glycol di(3-bromophenyl)ether

A 250 mL round-bottomed flask was charged with 7.69 g (14.1 mmol) of pentaethylene glycol di4p-toluenesulfonate), 7.30 g (42.2 mmol) of 3-bromophenol, 19.7 g of $K_2CO_3$ (0.143 mol), and 70 mL of DMF. The reaction was then left to stir overnight in a 60° C. oil bath, after which the solvent was removed via vacuum distillation. Dichloromethane was then added to the residue, and the resulting suspension was filtered to remove excess carbonate and salt byproducts. Afterwards, the solvent was removed with a rotary evaporator, and the residue was heated in a kugelrohr oven under a dynamic 5 mtorr vacuum to remove excess 3-bromophenol. The crude product was then chromatographed on silica with an eluent of hexanes/EtOAc adjusted to give an $R_f$ for the product of 0.2-0.3. Pentethylene glycol di(3-bromophenyl)ether (5.04 g, 9.19 mmol, 65% yield), was then isolated as a pale yellow oil after distillation at 200° C. (<1 mtorr): $^1$H NMR (300 MHz, CDCl$_3$) δ 7.05-7.15 (multiple resonances, 6H); 6.85 (dm, $J_d$=7.8 Hz, 2H); 4.09 (t, J=4.5 Hz, 4H); 3.83 (t, J=4.5 Hz, 4H); 3.66-3.74 (multiple resonances, 8H); 3.66 (s, 4H); $^{13}$C NMR (75 MHz, CDCl$_3$) δ 159.9, 130.4, 124.1, 122.8, 118.5, 113.9, 71.0, 70.8, 69.7, 68.0, (one signal not resolved). Anal. Calcd. for C$_{22}$H$_{28}$Br$_2$O$_6$: C, 48.20; H, 5.15; Found: C, 48.15; H, 5.18.

Example 4

Tris(4,4'-dihydroxydibenzylideneacetone)dipalladium(0) (F)

A 100 mL round-bottomed flask was charged with 0.928 g (11.3 mmol) of anhydrous sodium acetate, 1.24 g (4.66 mmol) of 1, 35 mL of methanol, and a magnetic stirbar. The flask was placed in a 50° C. oil bath, and after 15 minutes, 0.25 g (1.41 mmol) of palladium chloride was added. The mixture was allowed to stir in open air at 50° C. for four hours. The reaction was then poured into 100 mL of water, and the resulting precipitate was isolated via vacuum filtration. After rinsing well with water and diethyl ether, the crude product was dried in vacuo. This was the crude powder used in entries 8-9 of Table 2 (Examples 15 and 16). It was then taken up in 20 mL of THF, filtered through a pad of diatomaceous earth, and recrystallized by layering 30 mL of diethyl ether onto the filtered THF solution. After 24 h at room temperature, the resulting crystals were isolated via vacuum filtration, rinsed with diethyl ether, and dried in vacuo to yield 0.124 g (0.246 mmol Pd, 17.4%) of F as a dark purple powder crystalline mass. A sample of this was taken up in 1 mL of oxygen-free dioxane, filtered through diatomaceous earth, frozen, and then placed under vacuum overnight to freeze-dry the sample and produce the purified powder.

Example 5

4,4'-Diacetoxydibenzylideneacetone (2)

A 100 mL round-bottomed flask was charged with 0.971 g (3.65 mmol) of 1, 50 mL of acetic anhydride and a stirbar. The flask was fitted with a reflux condenser, and the reaction was brought to reflux for several hours. Afterwards, it was poured into 100 mL of water, resulting in the precipitation of a yellow solid. This was removed via vacuum filtration, after which it was recrystallized from ethanol resulting in the isolation of 0.951 g (2.72 mmol, 74.4%) of 2 as yellow needles.

Example 6

Tris[4,4'-diacetoxydibenzylideneacetone)dipalladium (0) (G)

A 100 mL round-bottomed flask was charged with 0.465 g (5.67 mmol) of anhydrous sodium acetate, 0.820 g (2.34 mmol) of 2, 18 mL of methanol, and a magnetic stirbar. The flask was placed in a 50° C. oil bath, and after 15 minutes, 0.125 g (0.705 mmol) of palladium chloride was added. The mixture was allowed to stir in open air at 40° C. for four hours. The reaction was then allowed to cool to room temperature, and the resulting precipitate was isolated via vacuum filtration. After rinsing well with water and methanol, the crude product was dried in vacuo. It was then taken up in 40 mL of boiling chloroform, filtered while still hot through a pad of diatomaceous earth, and recrystallized by layering 20 mL of diethyl ether onto the cooled, filtered chloroform solution. After a week at room temperature, the resulting crystals were isolated via vacuum filtration, rinsed with diethyl ether, and dried in vacuo to yield 0.113 g (0.179 mmol Pd, 25.3%) of G as a dark purple powder.

Example 7

Polymerizations

Initial studies with F were carried out on the crude powder isolated before recrystallization (entries 8 and 9). As shown in the table results, compared favorably to E and to the standard system involving C. However, as this material was not free of contaminates, it was later purified by recrystallization from THF and diethyl ether. While the crystalline form worked well in THF (entries 17-18), in which F is soluble, it performed poorly in CH$_2$Cl$_2$ (the preferred polymerization solvent), in which F is insoluble (entries 19-20). However, this solubility hurdle can be overcome by freeze-drying F from dioxane, thus generating a pure powder which again produced good results (entries 25-26). Alternatively, complex G, in which the hydroxyl groups are protected as the acetates, is soluble in CH$_2$Cl$_2$. As these dba ligands are released into the medium, the acetate groups are removed under the basic conditions, and the resulting phenoxides partition into the aqueous phase. This system produced results (entries 10, 11, 28, 29) only slightly inferior to those of F. In all cases, G and the powdered form of F (crude or freeze-dried) outperformed the standard system derived from C. However, they did not match the performance of E, which remains the best catalyst system we have screened to date. Conceivably, powdered F could more closely mimic E by undergoing a pre-reaction with the monomers and phosphine (thus permitting the palladium to enter the catalytic cycle prior to polymerization). In order to accomplish this, a polymerization was set up in which F was allowed to react with the monomers and phosphine in THF for 15 minutes, after which the solvent was removed in vacuo. The polymerization solvent (CH$_2$Cl$_2$) and base were then added in the usual manner. However, as shown in entry 27, the results did not differ appreciably from those obtained with powdered F introduced as per usual.

Example 7a

General Polymerization Procedure for Entries 1-19 in Table 2 (Examples 8-26)

To each of several 10 mL ampoules was added 0.500 mL of a CH$_2$Cl$_2$ stock solution 0.3 M in hexaethylene glycol di(3-bromophenyl)ether and 1,4-bis(1,3,2-dioxaborolan-2-yl)benzene monomers. Solvent was removed in vacuo after which the ampoules were back-filled with nitrogen, capped, wax-sealed, and stored at −10° C. in the dark until ready for use. Polymerizations were set up 6-12 at a time by charging the ampoules with stirbars along with the appropriate palladium source, 0.300 mL of degassed 3M aqueous K$_3$PO$_4$, phosphine cocatalyst (if required) and enough additional solvent so that each tube contained 0.150 mL of organic solvent and 0.300 mL of aqueous solution. The vessels were degassed via three freeze-pump-thaw cycles, sealed under vacuum, and placed in a thermostatted 50° C. water bath over an efficient magnetic stirrer for three days. The resulting materials were taken up in a minimal amount of CHCl$_3$ spiked with aliquat (2 drops per 100 mL), transferred to centrifuge tubes, extracted with 5% aqueous NaCN (1 mL) and washed 6 times with 1 mL of HPLC-grade water. The organic phases were transferred to separate scintillation vials (no drying agent was used), after which the solvent was removed with a rotary evaporator. The resulting films were then dried at 100° C. under a 1 mtorr vacuum for 20 minutes, and analyzed via GPC-LS without further purification.

Example 7b

General Polymerization Procedure for Entries 19-29 in Table 2 (Examples 27-32)

To each of several 10 mL ampoules was added 0.500 mL of a $CH_2Cl_2$ stock solution 0.3 M in pentaethylene glycol di(3-bromophenyl)ether and 1,4-bis(1,3,2-dioxaborolan-2-yl) benzene monomers. Solvent was removed in vacuo after which the ampoules were back-filled with nitrogen, capped, wax-sealed, and stored at −10° C. in the dark until ready for use. Polymerizations were set up 6-12 at a time by charging the ampoules with stirbars along with the appropriate palladium source, 0.300 mL of degassed 3M aqueous $K_3PO_4$, phosphine cocatalyst (if required) and enough additional solvent so that each tube contained 0.150 mL of organic solvent and 0.300 mL of aqueous solution. The vessels were degassed via three freeze-pump-thaw cycles, sealed under vacuum, and placed in a thermostatted 50° C. water bath over an efficient magnetic stirrer for three days. The resulting materials were taken up in a minimal amount of $CHCl_3$ spiked with aliquat (2 drops per 100 mL), transferred to centrifuge tubes, extracted with 5% aqueous NaCN (1 mL) and washed 6 times with 1 mL of HPLC-grade water. The organic phases were transferred to sealable microwave reaction tubes, after which they were heated to 150 degrees for fifteen minutes in a microwave pressure reactor. This procedure was sometimes required for complete dissolution of the material. Afterwards, the resulting solutions were stirred overnight with 5 mL of HPLC-grade water. The aqueous phases were then removed, and the chloroform solutions were transferred to separate scintillation vials (no drying agent was used), after which the solvent was removed with a rotary evaporator. The resulting films were then dried at 100° C. under a 1 mtorr vacuum for 20 minutes, and analyzed via GPC-LS without further purification.

Example 8

Table 2, Entry 1

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 1.8 mg (0.003 mmol Pd) of A, 75 µL of the phosphine stock (0.0030 mmol), 75 µL of degassed $CH_2Cl_2$, and 300 µL of degassed 3M aqueous $K_3PO_4$. The polymerization was then set up and worked up as described above, to provide 72.2 mg (94.8%) of the crude polymer as a filmy material.

Example 9

Table 2, Entry 2

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 2.2 mg (0.003 mmol Pd) of B, 75 µL of the phosphine stock (0.0030 mmol), 75 µL of degassed $CH_2Cl_2$, and 300 µL of degassed 3M aqueous $K_3PO_4$. The polymerization was then set up and worked up as described above, to provide 42.7 mg (56.0%, some mechanical loss) of the crude polymer as a filmy material.

Example 10

Table 2, Entry 3

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 2.2 mg (0.003 mmol Pd) of B, 75 µL of the phosphine stock (0.0030 mmol), 75 µL of degassed $CH_2Cl_2$, and 300 µL of degassed 3M aqueous $K_3PO_4$. The polymerization was then set up and worked up as described above, to provide 83.0 mg (109%) of the crude polymer as a filmy material.

Example 11

Table 2, Entry 4

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmoL of each monomer was then charged with a stirbar, 1.4 mg (0.003 mmol Pd) of C, 75 µL of the phosphine stock (0.0030 mmoL), 75 µL of degassed $CH_2Cl_2$, and 300 µL of degassed 3M aqueous $K_3PO_4$. The polymerization was then set up and worked up as described above, to provide 76.7 mg (101%) of the crude polymer as a filmy material.

Example 12

Table 2, Entry 5

An ampoule pre-loaded with 0.150 mmol of each monomer was then charged with a stirbar, 1.1 mg (0.0015 mmol Pd) of E, 150 µL of degassed $CH_2Cl_2$, and 300 µL of degassed 3M aqueous $K_3PO_4$. The polymerization was then set up and worked up as described above, to provide 85.6 mg (112%) of the crude polymer as a filmy material.

Example 13

Table 2, Entry 6

An ampoule pre-loaded with 0.150 mmol of each monomer was then charged with a stirbar, 1.1 mg (0.0015 mmol Pd) of E, 150 µL of degassed $CH_2Cl_2$, and 300 µL of degassed 3M aqueous $K_3PO_4$. The polymerization was then set up and worked up as described above, to provide 81.1 mg (106%) of the crude polymer as a filmy material.

Example 14

Table 2, Entry 7

An ampoule pre-loaded with 0.150 mmol of each monomer was then charged with a stirbar, 1.1 mg (0.0015 mmol Pd) of E, 150 µL of degassed $CH_2Cl_2$, and 300 µL of degassed 3M aqueous $K_3PO_4$. The polymerization was then set up and worked up as described above, to provide 84.6 mg (111%) of the crude polymer as a filmy material.

Example 15

Table 2, Entry 8

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 1.5 mg (0.003 mmol Pd) of F, 75 μL of the phosphine stock (0.0030 mmol), 75 μL of degassed $CH_2Cl_2$, and 300 μL of degassed 3M aqueous $K_3PO_4$. The polymerization was then set up and worked up as described above, to provide 90.4 mg (115%) of the crude polymer as a filmy material.

Example 16

Table 2, Entry 9

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 1.5 mg (0.003 mmol Pd) of F, 75 μL of the phosphine stock (0.0030 mmol), 75 μL of degassed $CH_2Cl_2$, and 300 μL of degassed 3M aqueous $K_3PO_4$. The polymerization was then set up and worked up as described above, to provide 76.8 mg (101%) of the crude polymer as a filmy material.

Example 17

Table 2, Entry 10

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 1.9 mg (0.003 mmol Pd) of G, 75 μL of the phosphine stock (0.0030 mmol), 75 μL of degassed $CH_2Cl_2$, and 300 μL of degassed 3M aqueous $K_3PO_4$. The polymerization was then set up and worked up as described above, to provide 98.3 mg (129%) of the crude polymer as a filmy material.

Example 18

Table 2, Entry 11

A stock solution 0.04 M in tri(o-tolyl)phosphine was prepared by dissolving 12.2 mg (0.0400 mmol) of the ligand in 1.0 mL oxygen-free $CH_2Cl_2$. An ampoule pre-loaded with 0.150 mmol of each monomer was then charged with a stirbar, 1.9 mg (0.003 mmol Pd) of G, 75 μL of the phosphine stock (0.0030 mmol), 75 μL of degassed $CH_2Cl_2$, and 300 μL of degassed 3M aqueous $K_3PO_4$. The polymerization was then set up and worked up as described above, to provide 83.6 mg (110%) of the crude polymer as a filmy material.

Example 19

Table 2, Entry 12

A stock solution 0.04 M in tri(o-tolyl)phosphine was prepared by dissolving 12.2 mg (0.0400 mmol) of the ligand in 1.0 mL oxygen-free THF. An ampoule pre-loaded with 0.150 mmol of each monomer was then charged with a stirbar, 1.4 mg (0.003 mmol Pd) of C, 150 μL of the phosphine stock (0.0060 mmol), and 300 μL of degassed 3M aqueous $K_3PO_4$. The polymerization was then set up and worked up as described above, to provide 75.8 mg (99.5%) of the crude polymer as a filmy material.

Example 20

Table 2, Entry 13

A stock solution 0.04 M in tri(o-tolyl)phosphine was prepared by dissolving 12.2 mg (0.0400 mmol) of the ligand in 1.0 mL oxygen-free THF. An ampoule pre-loaded with 0.150 mmol of each monomer was then charged with a stirbar, 1.4 mg (0.003 mmol Pd) of C, 150 μL of the phosphine stock (0.0060 mmol), and 300 μL of degassed 3M aqueous $K_3PO_4$. The polymerization was then setup and worked up as described above, to provide 85.3 mg (112%) of the crude polymer as a filmy material.

Example 21

Table 2, Entry 14

An ampoule pre-loaded with 0.150 mmol of each monomer was then charged with a stirbar, 3.5 mg (0.003 mmol Pd) of D, 150 μL of degassed THF, and 300 μL of degassed 3M aqueous $K_3PO_4$. The polymerization was then set up and worked up as described above, to provide 81.9 mg (107%) of the crude polymer as a filmy material.

Example 22

Table 2, Entry 15

An ampoule pre-loaded with 0.150 mmol of each monomer was then charged with a stirbar, 2.1 mg (0.003 mmol Pd) of E, 150 μL of degassed THF, and 300 μL of degassed 3M aqueous $K_3PO_4$. The polymerization was then set up and worked up as described above, to provide 80.6 mg (106%) of the crude polymer as a filmy material.

Example 23

Table 2, Entry 16

An ampoule pre-loaded with 0.150 mmol of each monomer was then charged with a stirbar, 2.1 mg (0.003 mmol Pd) of E, 150 μL of degassed THF, and 300 μL of degassed 3M aqueous $K_3PO_4$. The polymerization was then set up and worked up as described above, to provide 77.8 mg (102%) of the crude polymer as a filmy material.

Example 24

Table 2, Entry 17

A stock solution 0.04 M in tri(o-tolyl)phosphine was prepared by dissolving 12.2 mg (0.0400 mmol) of the ligand in 1.0 mL oxygen-free THF. An ampoule pre-loaded with 0.150 mmol of each monomer was then charged with a stirbar, 1.5 mg (0.003 mmol Pd) of F, 150 μL of the phosphine stock (0.0060 mmol), and 300 μL of degassed 3M aqueous $K_3PO_4$.

The polymerization was then set up and worked up as described above, to provide 81.3 mg (107%) of the crude polymer as a filmy material.

Example 25

Table 2, Entry 18

A stock solution 0.04 M in tri(o-tolyl)phosphine was prepared by dissolving 12.2 mg (0.0400 mmol) of the ligand in 1.0 mL oxygen-free THF. An ampoule pre-loaded with 0.150 mmol of each monomer was then charged with a stirbar, 1.5 mg (0.003 mmol Pd) of F, 150 µL of the phosphine stock (0.0060 mmol), and 300 µL of degassed 3M aqueous $K_3PO_4$. The polymerization was then set up and worked up as described above, to provide 76.3 mg (100%) of the crude polymer as a filmy material.

Example 26

Table 2, Entry 19

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.5 mg (0.003 mmol Pd) of crystalline F, 150 µL of the phosphine stock (0.0060 mmol), and 300 µL of degassed 3M aqueous $K_3PO_4$. The polymerization was then set up and worked up as described above, to provide 98.1 mg (129%) of the crude polymer as a filmy material.

Example 27

Table 2, Entry 20

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.5 mg (0.003 mmol Pd) of crystalline F, 150 µL of the phosphine stock (0.0060 mmol), and 300 µL of degassed 3M aqueous $K_3PO_4$. The polymerization was then set up and worked up as described above, to provide 94.9 mg (129%) of the crude polymer as a filmy material.

Example 28

Table 2, Entry 21

An ampoule pre-loaded with 0.150 mmol of each monomer was then charged with a stirbar, 2.2 mg (0.0030 mmol Pd) of E, 150 µL of degassed $CH_2Cl_2$, and 300 µL of degassed 3M aqueous $K_3PO_4$. The polymerization was then set up and worked up as described above, to provide 63.7 mg (91.5%) of the crude polymer as a filmy material.

Example 28

Table 2, Entry 22

An ampoule pre-loaded with 0.150 mmol of each monomer was then charged with a stirbar, 2.2 mg (0.0030 mmol Pd) of E, 150 µL of degassed $CH_2Cl_2$, and 300 mL of degassed 3M aqueous $K_3PO_4$. The polymerization was then setup and worked up as described above, to provide 60.2 mg (86.5%) of the crude polymer as a filmy material.

Example 29

Table 2, Entry 23

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.4 mg (0.003 mmol Pd) of C, 150 µL of the phosphine stock (0.0060 mmol), and 300 µL of degassed 3M aqueous $K_3PO_4$. The polymerization was then set up and worked up as described above, to provide 77.0 mg (111%) of the crude polymer as a filmy material.

Example 30

Table 2, Entry 24

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.4 mg (0.003 mmol Pd) of C, 150 µL of the phosphine stock (0.0060 mmol), and 300 µL of degassed 3M aqueous $K_3PO_4$. The polymerization was then set up and worked up as described above, to provide 48.3 mg (69.4%) of the crude polymer as a filmy material.

Example 31

Table 2, Entry 25

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.5 mg (0.003 mmol Pd) of freeze-dried F, 150 µL of the phosphine stock (0.0060 mmol), and 300 µL of degassed 3M aqueous $K_3PO_4$. The polymerization was then set up and worked up as described above, to provide 70.8 mg (102%) of the crude polymer as a filmy material.

Example 32

Table 2, Entry 26

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.5 mg (0.003 mmol Pd) of freeze-dried F, 150 µL of the phosphine stock (0.0060 mmol), and 300 µL of degassed 3M aqueous $K_3PO_4$. The polymerization was then set up and worked up as described above, to provide 62.4 mg (89.7%) of the crude polymer as a filmy material.

Example 33

Table 2, Entry 27

A stock solution 0.04 M in tri(o-tolyl)phosphine was prepared by dissolving 24.4 mg (0.0400 mmol) of the ligand in 2 mL oxygen-free THF. An ampoule pre-loaded with 0.150 mmol of each monomer was then charged with a stirbar, 1.5 mg (0.003 mmol Pd) of freeze-dried F, and 150 μL of the phosphine stock (0.0060 mmol). This mixture was allowed to stir under nitrogen at room temperature for 15 minutes, after which the solvent was removed in vacuo. Afterwards, 150 μL degassed $CH_2Cl_2$ and 300 μL of degassed 3M aqueous $K_3PO_4$ were added via syringe. The polymerization was then set up and worked up as described above, to provide 83.4 mg (120%) of the crude polymer as a filmy material.

Example 34

Table 2, Entry 28

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.9 mg (0.003 mmol Pd) of G, 150 μL of the phosphine stock (0.0030 mmol), and 300 μL of degassed 3M aqueous $K_3PO_4$. The polymerization was then set up and worked up as described above, to provide 75.2 mg (108%) of the crude polymer as a filmy material.

Example 35

Table 2, Entry 29

A stock solution 0.04 M in tri(o-tolyl)phosphine was prepared by dissolving 24.4 mg (0.0400 mmol) of the ligand in 2 mL oxygen-free $CH_2Cl_2$. An ampoule pre-loaded with 0.150 mmol of each monomer was then charged with a stirbar, 1.9 mg (0.003 mmol Pd) of G, 150 μL of the phosphine stock (0.0030 mmol), and 300 μL of degassed 3M aqueous $K_3PO_4$. The polymerization was then set up and worked up as described above, to provide 71.3 mg (102%) of the crude polymer as a filmy material.

Various modifications of the invention, in addition to those described herein, will be apparent to those skilled in the art from the foregoing description. Such modifications are also intended to fall within the scope of the appended claims. Each reference, including all patent, patent applications, and publications, cited in the present application is incorporated herein by reference in its entirety.

What is claimed is:
1. A palladium complex, or salt thereof, having at least one atom of palladium(0), at least one ligand of Formula Ia, and, optionally, one or more $L^1$;

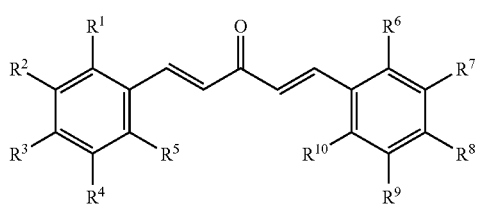

(Ia)

wherein:
$L^1$ is a ligand;
$R^1$, $R^2$, $R^3$, $R^4$, $R^5$, $R^6$, $R^7$, $R^8$, $R^9$, and $R^{10}$ are each independently selected from hydrogen, chloro fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S$(O)_2$—, HO—S(O)—, $(HO)_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein said $C_{1-4}$ alkylene is substituted by a moiety selected from $C_{1-4}$ alkoxy, $C_{1-4}$ haloalkoxy, carboxy, HO—S$(O)_2$—, HO—S(O)—, $(HO)_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 independently selected $R^a$ groups;

or two adjacent groups selected from $R^6$, $R^7$, $R^8$, $R^9$, and $R^{10}$, along with the carbons to which they are attached, do not form a fused phenyl ring or a 5- or 6-membered heteroaryl ring, each of which is optionally substituted by 1 to 2 $R^b$ independently selected groups; and each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S$(O)_2$—, HO—S(O)—, $(HO)_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy;

with the five provisos that:
(1) at least one of $R^1$, $R^2$, $R^3$, $R^4$, $R^5$, $R^6$, $R^7$, $R^8$, $R^9$, and $R^{10}$ is independently selected from, carboxy, di($C_{1-4}$ alkyl)amino, HO—S$(O)_2$—, HO—S(O)—, $(HO)_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein said $C_{1-4}$ alkylene is substituted by a moiety selected from carboxy, HO—S$(O)_2$—, HO—S(O)—, $(HO)_2$P(O)—, quaternary salt of $C_{2-8}$ dialkylamino, $C_{1-4}$ alkylcarbonyloxy, and $C_{1-4}$ haloalkylcarbonyloxy, $C_{1-4}$ alkyloxycarbonyl, and $C_{1-4}$ haloalkyloxycarbonyl; and (2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

2. A palladium complex according to claim 1, wherein at least of one of $R^1$, $R^2$, $R^3$, $R^4$, and $R^5$ and at least one of $R^6$, $R^7$, $R^8$, $R^9$, and $R^{10}$ are each independently selected from carboxy, and HO—S(O)$_2$—.

3. A palladium complex according to claim 1, wherein at least of one of $R^1$, $R^2$, $R^3$, $R^4$, and $R^5$ and at least one of $R^6$, $R^7$, $R^8$, $R^9$, and $R^{10}$ are carboxy.

4. A palladium complex according to claim 1 wherein at least of one of $R^1$, $R^2$, $R^3$, $R^4$, and $R^5$ and at least one of $R^2$ are each $C_{1-4}$ alkylcarbonyloxy.

5. A palladium complex according to claim 1, wherein at least of one of $R^1$, $R^2$, $R^3$, $R^4$, and $R^5$ and at least one of $R^6$, $R^7$, $R^8$, $R^9$, and $R^{10}$ are each independently selected from carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, alkyl)silyloxy, tri($C_{1-4}$ haloalkyl)silyloxy, and $C_{1-4}$ alkylene, wherein said $C_{1-4}$ alkylene is substituted by a moiety selected from carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and the remaining $R^1$, $R^2$, $R^3$, $R^4$, $R^5$, $R^6$, $R^7$, $R^8$, $R^9$, and $R^{10}$ groups are each independently selected from hydrogen, chloro, fluoro, cyano, nitro, $C_{1-4}$ alkyl, $C_{1-4}$ haloalkyl, $C_{1-4}$ alkoxy, and $C_{1-4}$ haloalkoxy.

6. A palladium complex according to claim 1, wherein at least of one of $R^1$, $R^2$, $R^3$, $R^4$, and $R^5$ and at least one of $R^6$, $R^7$, $R^8$, $R^9$, and $R^{10}$ are each independently selected from carboxy, and HO—S(O)$_2$—; and the remaining $R^1$, $R^2$, $R^3$, $R^4$, $R^5$, $R^6$, $R^7$, $R^8$, $R^9$, and $R^{10}$ groups are each independently selected from hydrogen, chloro, fluoro, cyano, nitro, $C_{1-4}$ alkyl, $C_{1-4}$ haloalkyl, $C_{1-4}$ alkoxy, and $C_{1-4}$ haloalkoxy.

7. A palladium complex according to claim 1, wherein at least of one of $R^1$, $R^2$, $R^3$, $R^4$, and $R^5$ and at least one of $R^6$, $R^7$, $R^8$, $R^9$, and $R^{10}$ are carboxy; and the remaining $R^1$, $R^2$, $R^3$, $R^4$, $R^5$, $R^6$, $R^7$, $R^8$, $R^9$, and $R^{10}$ groups are each independently selected from hydrogen, chloro, fluoro, cyano, nitro, $C_{1-4}$ alkyl, $C_{1-4}$ haloalkyl, $C_{1-4}$ alkoxy, and $C_{1-4}$ haloalkoxy.

8. A palladium complex according to claim 1, wherein at least three of $R^1$, $R^2$, $R^3$, $R^4$, and $R^5$ are hydrogen and at least three of $R^6$, $R^7$, $R^8$, $R^9$, and $R^{10}$ are hydrogen.

9. A palladium complex according to claim 1, wherein at least four of $R^1$, $R^2$, $R^3$, $R^4$, and $R^5$ are hydrogen and at least four of $R^6$, $R^7$, $R^8$, $R^9$, and $R^{10}$ are hydrogen.

10. A palladium complex according to claim 1, wherein each $L^1$ is independently selected from trimethylphosphine, triethylphosphine, tripropylphosphine, triisopropylphosphine, tributylphosphine, tricyclohexylphosphine, tri(t-butyl)phosphine, 1,1'-bis (diphenylphosphino)ferrocene, 1,1'-bis(di-t-butylphosphino)ferrocene, 1'-(di-t-butylphosphino)-1,2,3,4,5-pentaphenylferrocene, tri(2-furyl)phosphine, 2-(di-t-butylphosphino)biphenyl, 2-(dicyclohexyl)biphenyl, butyldi-1-adamantylphosphine, 2,2'-bis(diphenylphosphino)-1,1'-binaphthyl, tri(p-tolyl)phosphine, trimethyl phosphite, triethyl phosphite, tripropyl phosphite, triisopropyl phosphite, tributyl phosphite, tris(2,4-di-t-butylphenyl)phosphite, tricyclohexyl phosphite, triphenylphosphine, tri(o-tolyl)phosphine, triisopropylphosphine, an N-heterocyclic carbene ligand, and disubstituted 1,4-diaza-1,3-butadiene.

11. A palladium complex according to claim 1, wherein each $L^1$ is tri(o-tolyl)phosphine.

12. A palladium complex according to claim 1, wherein two adjacent groups selected from $R^1$, $R^2$, $R^3$, $R^4$, and $R^5$, along with the carbons to which they are attached, do not form a fused phenyl ring or a 5- or 6-membered heteroaryl ring; and two adjacent groups selected from $R^6$, $R^7$, $R^8$, $R^9$, and $R^{10}$, along with the carbons to which they are attached, do not form a fused phenyl ring or a 5- or 6-membered heteroaryl ring.

13. A palladium complex according to claim 1 wherein said complex is of Formula I:

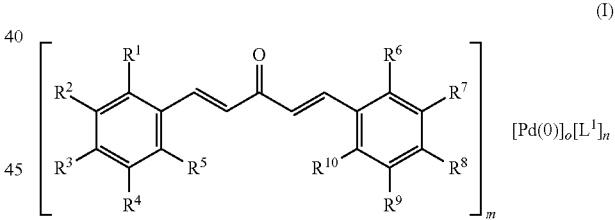

or salt thereof;
wherein:
n is from 0 to 2;
m is from 1 to 4;
o is from 1 to 2.

14. A palladium complex according to claim 1, which is selected from:
tris(4,4'-di(acetyloxy)dibenzylideneacetone)dipalladium (0);
bis(4,4'-di(acetyloxy)dibenzylideneacetone)palladium (0);
tetrakis(4,4'-di(acetyloxy)dibenzylideneacetone)dipalladium(0); and
tris(4,4'-di(acetyloxy)dibenzylideneacetone)palladium (0);
or salt thereof.

15. A palladium complex according to claim 1, wherein four of $R^1$, $R^2$, $R^3$, $R^4$, and $R^5$ are hydrogen and four of $R^6$, $R^7$, $R^8$, $R^9$, and $R^{10}$ are hydrogen.

16. A process for preparing a diaromatic compound, comprising mixing a palladium complex according to claim 1, an aromatic substrate having one group selected from bromo, iodo, tosylate, benzenesulfonate, mesylate, triflate, and chloro, an aromatic boronate having one group selected from boronic acid, boronic ester, and borane, a base, a ligand, an organic solvent, and water and reacting under conditions sufficient to form the diaromatic compound.

17. A polymerization process comprising mixing a palladium complex according to claim 1, an aromatic substrate having two groups independently selected from bromo, iodo, tosylate, benzenesulfonate, mesylate, triflate, and chloro, an aromatic diboronate having two groups independently selected from boronic acid, boronic ester, and borane, a base, a ligand, a organic solvent and water; and reacting under conditions sufficient to form a polymer.

18. A palladium complex, or salt thereof, having at least one atom of palladiuma(0), at least one ligand of Formula Ia, and, optionally, one or more $L^1$;

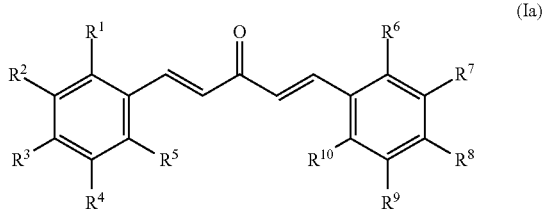

(Ia)

wherein:

$L^1$ is a ligand;

$R^1$, $R^2$, $R^3$, $R^4$, $R^5$, $R^6$, $R^7$, $R^8$, $R^9$, and $R^{10}$ are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, hydroxyl, carboxy, quaternary salt of $C_{2-8}$ dialkylamino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$haloalkyl)silyloxy, and $C_{1-4}$ alkylene, wherein said $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 independently selected $R^b$ groups; and or two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 independently selected $R^b$ groups; and each $R^a$ and $R^b$ is independently selected from chloro, fluoro, cyano, nitro, $C_{1-4}$ alkyl, $C_{1-4}$ alkoxy, $C_{1-4}$ haloalkyl, hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy;

with the six provisos that:

(1) at least one of $R^1$, $R^2$, $R^3$, $R^4$, $R^5$, $R^6$, $R^7$, $R^8$, $R^9$, and $R^{10}$ is independently selected from hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein said $C_{1-4}$ alkylene is substituted by a moiety selected from carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and (2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups;

(5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (6) if one of $R^1$, $R^2$, $R^3$, $R^4$, or $R^5$ is hydroxyl, none of $R^6$, $R^7$, $R^8$, $R^9$, and $R^{10}$ are hydroxyl.

19. A palladium complex, or salt thereof, having at least one atom of palladium(0), at least one ligand of Formula Ia, and, optionally, one or more $L^1$;

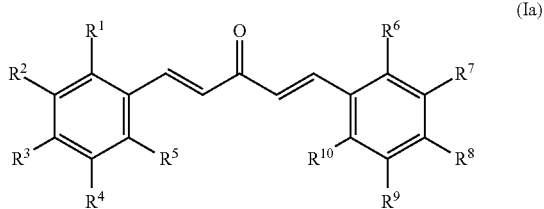

wherein:

$L^1$ is a ligand;

$R^1$, $R^2$, $R^3$, $R^4$, $R^5$, $R^6$, $R^7$, $R^8$, $R^9$, and $R^{10}$, are each independently selected from hydrogen, chloro, fluoro, cyano, nitro, $C_{1-4}$ alkyl, $C_{1-4}$ haloalkyl, $C_{1-4}$ alkoxy, $C_{1-4}$ haloalkoxy, $C_{1-4}$ non-terminal alkenyl, $C_{1-4}$ non-terminal alkynyl, amino, $C_{1-4}$ alkylamino, $C_{2-8}$ dialkylamino, $C_{3-6}$ cycloalkyl, phenyl, a 5- or 6-membered heteroaryl ring, a 5- or 6-membered hetercycloalkyl ring, carboxy, quaternary salt of $C_{2-8}$ dialkylamino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein said $C_{1-4}$ alkylene is substituted by a moiety selected from $C_{1-4}$ alkoxy, $C_{1-4}$ haloalkoxy, carboxy, HO—S(O)$_2$—, HO—S(O)—, (HO)$_2$P(O)—, quaternary salt of $C_{2-8}$ dialkylamino, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl;

or two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 independently selected $R^a$ groups;

or two adjacent groups selected from $R^6$, $R^7$, $R^8$, $R^9$, and $R^{19}$, along with the carbons to which they are attached, form a fused phenyl ring or a 5- or 6-membered heteroaryl ring, each of which is optionally substituted by 1 to 2 independently selected $R^b$ groups; and each $R^a$ and $R^b$ is independently selected from chloro, fluoro, cyano, nitro, $C_{1-4}$ alkyl, $C_{1-4}$ alkoxy, $C_{1-4}$ haloalkoxy, $C_{1-4}$ haloalkyl, hydroxyl, carboxy, di($C_{1-4}$ alkyl)amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, and tri($C_{1-4}$ haloalkyl)silyloxy;

with the five provisos that:

(1) at least one of $R^1$, $R^2$, $R^3$, $R^4$, $R^5$, $R^6$, $R^7$, $R^8$, $R^9$, and $R^{10}$ is independently selected from, carboxy, di($C_{1-4}$ alkyl) amino, HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, $C_{1-4}$ haloalkyloxycarbonyl, tri($C_{1-4}$ alkyl)silyloxy, tri($C_{1-4}$ haloalkyl)silyloxy, and $C_{1-4}$ alkylene, wherein said $C_{1-4}$ alkylene is substituted by a moiety selected from HO—S(O)$_2$—, HO—S(O)—, (HO)$_2$P(O)—, $C_{1-4}$ alkylcarbonyloxy, $C_{1-4}$ haloalkylcarbonyloxy, $C_{1-4}$ alkyloxycarbonyl, and $C_{1-4}$ haloalkyloxycarbonyl; and (2) if one of $R^1$, $R^2$, $R^3$, $R^4$, and $R^5$ is selected from $C_{3-6}$ cycloalkyl, phenyl, a 5- or 6-membered heteroaryl ring, and a 5- or 6-membered hetercycloalkyl ring; then: (a) the remaining $R^1$, $R^2$, $R^3$, $R^4$, and $R^5$ are not selected from $C_{3-6}$ cycloalkyl, phenyl, a 5- or 6-membered heteroaryl ring, and a 5- and 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (3) if one of $R^6$, $R^7$, $R^8$, $R^9$, and $R^{10}$ is selected from $C_{3-6}$ cycloalkyl, phenyl, a 5- or 6-membered heteroaryl ring, or a 5- or 6-membered hetercycloalkyl ring; then (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- and 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups; and (4) if two adjacent groups selected from $R^1$, $R^2$, $R^3$, $R^4$, and $R^5$, along with the carbons to which they are attached, form a fused phenyl ring or a 5- or 6-membered heteroaryl ring, each of which is optionally substituted by 1 to 2 $R^a$ independently selected groups; then: (a) the remaining $R^1$, $R^2$, $R^3$, $R^4$, and $R^5$ groups are not selected from $C_{3-6}$ cycloalkyl, phenyl, a 5- or 6-membered heteroaryl ring, and a 5- or 6-membered hetercycloalkyl ring; and (b) the remaining $R^1$, $R^2$, $R^3$, $R^4$, and $R^5$ adjacent groups, along with the carbons to which they are attached, do not form a fused phenyl ring or a 5- or 6-membered heteroaryl ring, each of which is optionally substituted by 1 to 2 $R^a$ independently selected groups; and (5) if two adjacent groups selected from $R^6$, $R^7$, $R^8$, $R^9$, and $R^{10}$, along with the carbons to which they are attached, form a fused phenyl ring or a 5- or 6-membered heteroaryl ring, each of which is optionally substituted by 1 to 2 $R^b$ independently selected groups; then: (a) the remaining $R^6$, $R^7$, $R^8$, $R^9$, and $R^{10}$ groups are not selected from $C_{3-6}$ cycloalkyl, phenyl, a 5- or 6-membered heteroaryl ring, and a 5- or 6-membered hetercycloalkyl ring; and (b) the remaining $R^6$, $R^7$, $R^8$, $R^9$, and $R^{10}$ adjacent groups, along with the carbons to which they are attached, do not form a fused phenyl ring or a 5- or 6-membered heteroaryl ring, each of which is optionally substituted by 1 to 2 $R^b$ independently selected groups.

* * * * *